(12) United States Patent
Zhao et al.

(10) Patent No.: US 8,673,810 B2
(45) Date of Patent: Mar. 18, 2014

(54) PHOTO ELECTRODES

(75) Inventors: Huijun Zhao, Highland Park (AU);
Mark Imisides, Scoresby (AU);
Shanqing Zhang, Mudgereeba (AU)

(73) Assignee: Aqua Diagnostic Pty Ltd., South Melbourne (AU)

(*) Notice: Subject to any disclaimer, the term of this patent is extended or adjusted under 35 U.S.C. 154(b) by 384 days.

(21) Appl. No.: 12/743,078

(22) PCT Filed: Nov. 14, 2008
(Under 37 CFR 1.47)

(86) PCT No.: PCT/AU2008/001688
§ 371 (c)(1),
(2), (4) Date: Jan. 5, 2011

(87) PCT Pub. No.: WO2009/062248
PCT Pub. Date: May 22, 2009

(65) Prior Publication Data
US 2012/0010068 A1    Jan. 12, 2012

(30) Foreign Application Priority Data

Nov. 16, 2007    (AU) .............................. 2007906272

(51) Int. Cl.
*B01J 23/00*    (2006.01)

(52) U.S. Cl.
USPC .............................. 502/350; 423/610; 516/90

(58) Field of Classification Search
USPC .............................. 516/90; 502/350; 423/610
See application file for complete search history.

(56) References Cited

U.S. PATENT DOCUMENTS

| | | | |
|---|---|---|---|
| 4,166,147 A * | 8/1979 | Lange et al. ................... | 428/328 |
| 5,096,745 A | 3/1992 | Anderson et al. | |
| 5,981,426 A | 11/1999 | Langford et al. | |
| 6,645,307 B2 * | 11/2003 | Fox et al. ........................... | 134/6 |
| 7,144,840 B2 | 12/2006 | Yeung et al. | |
| 2004/0176600 A1 * | 9/2004 | Juhue et al. ..................... | 546/14 |
| 2006/0102226 A1 | 5/2006 | Kern et al. | |
| 2006/0240558 A1 * | 10/2006 | Zhao .............................. | 436/62 |
| 2006/0258757 A1 * | 11/2006 | Wakizaka et al. ............... | 516/90 |

* cited by examiner

*Primary Examiner* — Kaj K Olsen
*Assistant Examiner* — Pritesh Darji
(74) *Attorney, Agent, or Firm* — Novak Druce Connolly Bove + Quigg LLP

(57) ABSTRACT

Methods of fabricating nano particulate Titanium dioxide photocatalysts onto a conducting substrate are disclosed. The methods include hydrothermal fabrications with heat treatment steps to increase the crystallinity and photoactivity of the titanium dioxide layers.

7 Claims, 15 Drawing Sheets

PHOTO ELECTRODES

CROSS REFERENCE TO RELATED APPLICATIONS

This application is a National Phase filing under 35 U.S.C. §371 of PCT/AU2008/001688 filed on Nov. 14, 2008; and this application claims priority to Application No. 2007906272 filed in Australia on Nov. 16, 2007 under 35 U.S.C. §119; the entire contents of all are hereby incorporated by reference.

This invention relates to new titanium dioxide photoelectrodes and to methods of fabricating them particularly for use in photoelectrochemical cells.

BACKGROUND TO THE INVENTION $TiO_2$ has been the dominant semiconductor photocatalyst, although there are many other types of semiconductor photocatalysts. The domination of TiO2 in the field can be attributed to its superior photocatalytic oxidation ability, as well as its non-photocorrosive, non-toxic and inexpensive characteristics and can be readily synthesized in its highly photoactive nanoparticle forms. In practice, different applications may well require photocatalysts with different photocatalytic characteristics. These characteristics are known to be determined by the structural, compositional and morphological parameters of the material, which can be manipulated via different synthesis methods under different conditions.

Over the past 20 years, many synthesis methods have been developed for fabrication of different forms of TiO2 photocatalysts. The Sol-gel method, electrochemical anodization method, liquid template method and various hydrothermal methods are the most widely used synthesis methods. Among these methods, sol-gel method is the earliest and most well-studied method for synthesis nanoparticulate TiO2 photocatalyst. It has been used almost exclusively to obtain the nanoparticulate form of TiO2.

The electrochemical anodization method was first reported in 2001. The method is capable of achieving large scale highly ordered and vertically aligned TiO2 nanotubes via a simple one step electrochemical process. The subsequent thermal treatment results in highly photocatalytic active forms of TiO2 nanotubes suitable for a range of applications. The attraction of such a form of TiO2 photocatalysts lies in their unique dimensional structure, rich source of new physicochemical properties, and their enormous application potential to various fields. It has been widely reported that utilising a vertically aligned nanotubular TiO2 photoanode can increase the photocatalytic efficiency of water cleavage and dye-sensitized solar cells. The mechanistic basis of photocatalytic efficiency enhancement has been attributed to the effective electron percolation pathway provided by the highly ordered perpendicularly aligned nanotubular architecture. For a nanoparticulate system, the structure disorder at the contact between nanoparticles increases the scattering of free electrons and therefore reduces electron mobility. Consequently, the electron transport is often the limiting factor of the overall photocatalytic process.

The liquid template method is a diversified method that covers a very broad range of different templates and based on very different mechanisms. Different forms of TiO2 nanostructures (e.g. nano-planar, nanotubular, mesoporous, highly ordered and patented arrays) can be obtained by this method. Hydrothermal methods have been around for many years but only recently being employed for synthesis of nano-structured TiO2. The method can be used to synthesise various forms of TiO2 including nano-planar, nanotubular, nanofibre and mesoporous forms.

U.S. Pat. No. 5,525,440 discloses forming a photo-electrochemical cell in which an initial layer of titanium oxide is formed and annealed on a conductive glass as a porous layer and then a non porous titanium oxide layer is applied and then finally a further porous titanium oxide layer is applied and the whole electrode is then annealed at 500 C. The electrode is then subjected to a further titanium oxide electrochemical deposition.

U.S. Pat. No. 6,281,429 discloses a transparent electrode of titanium dioxide on ITO glass and is formed at a thickness determined by a particular formula.

Japanese abstract 2004196644 discloses a forming a titanium dioxide film from a sol and then sintering it.

Japanese abstract 59121120 discloses a reduction in vacuum treatment for titanium dioxide to improve its efficiency.

U.S. Pat. No. 629,970 discloses a method of forming a semiconductor oxide in which the nano particles are first formed by precipitation, heated in the range of 250 C to 600 C, then dispersed and coated on a surface and then treating the coating at a temperature below 250 C to a pressure between 100 and 10000 bar.

U.S. Pat. No. 6,444,189 discloses a method of forming titanium dioxide particles by adding an acidic titanium salt solution to an aqueous base at a temperature of 20 C to 95 C to precipitate the particles while keeping the final pH between 2 and 4.

U.S. Pat. No. 7,224,036 discloses a method of forming a photoelectric transducer using a binder and an oxide which includes a pressure treatment at a low temperature to avoid sintering.

WO 2007/023543 discloses a method of forming a titanium oxide using a process that utilizes a titanium nitride intermediate and finished by electrolysis.

WO 2007/020485 discloses a low temperature method of forming titanium oxide photo catalysts with a dye modified surface.

U.S. Pat. No. 5,362,514 discloses a photo electric anode on which a porous metal oxide is coated and includes a porphyrin-Phthalocyanine dye.

U.S. Pat. No. 5,693,432 discloses a titanium oxide and a polymeric solid electrolyte.

U.S. Pat. No. 6,538,194 discloses a photo electrode cell including anatase titanium dioxide and a sealed electrolyte and conductive protrusions are covered by the oxide layer.

U.S. Pat. No. 6,685,909 discloses a nano crystalline titanium dioxide hetero junction materials with a shell of Molybdenum oxide.

U.S. Pat. No. 6,855,202 discloses shaped nano crystal particles including branched particles.

Patent specification WO 2004/088305 discloses the use of $TiO_2$ photoelectrodes in determining chemical oxygen demand in water samples. For this application the $TiO_2$ photocatalyst should possess the following general characteristics:

(i) Be readily immobilised to form the photoanode;
(ii) Readily achieve the immobilised thin-film form on a conductive substrate (photoanode) with uniformity and reproducibility;
(iii) Provide high quantum efficiency, photocatalytic activity and superior kinetic properties;
(iv) Be selective and offer highly sensitive photocatalytic oxidation towards organic compounds (over water oxidation);

(v) Provide high oxidation power, capable of rapidly mineralising a wide-spectrum of organic compounds in a non-discriminatory manner;

(vi) Having good connectivity among the crystal grain boundaries, so enabling 100% photoelectron collection efficiency;

(vii) Having stable surface properties, which eliminate the need for preconditioning before use.

(viii) Offering low photocorrosion and high mechanical adhesion to the substrate, so ensuring long-term stability.

It is an object of this invention to provide a range of fabrication methods for producing preferred photoelectrodes for various applications.

BRIEF DESCRIPTION OF THE INVENTION

To this end the present invention in a first embodiment provides a method of forming a titanium dioxide photocatalyst in which a) titanium dioxide colloidal particles are formed in solution and then subjected to dialysis while maintaining the pH below 4 b) The dialysed solution is the subjected to a hydrothermal treatment c) The colloid from step b) is then coated on a substrate of conducting glass and dried d) the coated substrate from step c) is calcined at approximately 700 C.

This method is found to produce photo anodes suitable for use in the COD method as disclosed in WO 2004/088305.

A chromic acid washing step is preferably introduced to pre-treat the ITO substrate. This additional step creates a more hydrophilic surface that improves the uniformity of the immobilised film, which is in turn improving the reproducibility of the resultant photoanode. It also creates a suitable surface roughness to enhance the mechanical adhesion between the immobilised TiO2 layer and the substrate, which ensures the long-term stability of the resultant photoanode.

A highly dynamic surface of the photocatalysts can create a major problem for any practical use since such a dynamic surface requires considerable time to be stabilised (by preconditioning) before any meaningful measurement can occur. It is known that the surface dynamic properties of the photocatalyst are strongly influenced by $TiO_2$ colloidal size. In general, too large size colloids produce a lower effective surface area that leads to decreased photoactivity. However, on the other hand, excessively small particle size colloids create a highly dynamic photocatalytic surface, and also reduce crystallinity, increase the grain boundary impedance and decrease the connectivity between the crystal grains. Consequently, the resultant photoanode produced from smaller particles is found to require a very long preconditioning period and possesses lower stability, reproducibility, photocatalytic activity and photoelectron collection efficiency.

The colloidal surface chemistry also plays an important role in determining the surface dynamic properties of the resultant photocatalyst. It is well know that the pH have strong influence on the chemical forms of the colloidal surface. A suitable pH produces stable surface chemical forms that lead to an improved crystallinity and lees dynamic surface.

With the procedures proposed by Nazeeruddin and Grätzel, the resultant colloidal sizes are often ~10 nm, but have no control of final pH of the colloidal suspension. Therefor, in this invention, a dialysis step is introduced in between the pectisation and the hydrothermal treatment steps, to minimise the surface dynamic properties of the resultant photoanode.

With the introduction of the dialysis step, the small size colloids and non-colloidal forms titania can be easily removed without significant effect on the remained portions of colloidal solution. It should be mentioned that the removal of the non-colloidal forms of titania is extremely important as such forms of titania are often very small in size (e.g., an oligomeric form of titania with 2 to 9 Ti atoms), which may have a detrimental effect on the photoactivity due to reduced crystallinity, high grain boundary impedance, low connectivity between the crystal grains and diminished photoelectron collection efficiency. The resultant colloidal sizes ranged from 8 nm to 35 nm, which have been found to be optimal sizes to produce high performance photoanodes. The introduced dialysis step also serves to regulate the colloidal pH at a desired level without the need to introduce further chemical species. Thus this process stabilises the chemical forms of the colloidal surface, which is found to be highly beneficial in minimising the surface dynamic effect of the photocatalyst. As a result, highly photoactive photoanodes are produced. These photoanodes have been found to be very stable and can tolerate a wide range of environmental conditions. They require minimal (if any) preconditioning before use. In addition, these photoanodes are capable of ~100% collection of photoelectrons produced by the oxidation of any organic species in a water sample.

It has been found that photo anodes produced by this method can be made sufficiently stable to perform over 6000 COD determinations. These photo anodes exhibit a near universal capability to oxidise organic compounds in water samples, wherever the compound has a nonzero COD. This method lends itself to the design of specific photocatalysts which have preferred reactivity towards aliphatic or aromatic organic molecules which may occur as impurities in water samples and so enable their use as photoanodes in photoelectrochemical oxidation for the measurement of "component COD" of various organic fractions in a water source.

In a second embodiment this invention provides a method of fabricating a titanium dioxide photocatalyst in which a) a template formation solution of a polymer and a titanium compound is coated onto a conducting substrate b) The coated substrate is subjected to hydrothermal treatment at a temperature of from 50 to 130 C for from 5 to 170 hours c) The treated substrate from step b) is then heated at between 450 and 650 C for 0.5 to 5 hours.

This produces a photocatalytically active $TiO_2$ film with ordered structures based on the polymer template. Preferably hexagonal structures are produced using polystyrene and titanium tetraisopropoxide (TTIP) as the template solution. Recently, template methods, especially, the liquid template methods have been developed for synthesis of meso-structured hybrid materials and mesoporous metal oxide materials. Among them, the so-called "breath figure" method has received great attention because the method is capable of producing large scale highly ordered 3-D micro-hexagonal arrays (i.e., honeycomb-like, structured porous films). A unique feature of the material structures produced by the breath figure method is that, at the micro-scale, they possess highly ordered, perfect 3-D micro-hexagonal structures (0.5 to 20 μm), while at the nano-scale, they exhibit nanoporous structures. In other words, the micro-hexagonal structures are built up from the nanoporous structures.

These uniquely configured co-existing micro-nano scale structures are potentially attractive for many applications. More importantly, such dual-scaled structures permit methods for easy modification by many means to suit specific applications. Previously, breath figure methods have mainly been used to create a micro template (precursor template) that is formed purely by the use of organic materials and often diblock co-polymers are used as structure directing agents. The produced precursor template is then used as a 'negative impression' template that retains the desired material. When the precursor organic template is thermally removed, thereafter the resultant pattern for the desired material is the positive pattern posited relative to the precursor template pattern.

The vapour phase hydrothermal method (VPH) of this invention achieves better mechanical strength via the formation of a Ti-oxo bridged large titania inorganic polymer network. The VPH treatment is preferably carried out below 100° C. in a sealed autoclave reactor with a holder provided to keep the sample above the water level. Under such conditions, the conversion of the vast majority of TTIP into its fully hydrolysed product (i.e. $Ti(OH)_4$) can be expected. These favourable reaction conditions will also lead to high degrees of condensation/polymerisation of hydrolysed TTIP products to produce $H_2Ti_xO_{1+x}.nH_2O$ or $Ti_xO_{2x}.mH_2O$, forming strong Ti-oxo networks.

This embodiment of the invention provides a new means to create and utilise this type of template. With this invention, the functional material is added into the structure directing agent before template synthesis. In terms of material composition, the resultant template prepared in such a way is a hybrid material template that consists of organic (diblock co-polymers) and metal oxides ($TiO_2$). This hybrid precursor template in situ can be converted into a pure $TiO_2$ 3-D micro-hexagonal array by this newly developed method. The conversion is achieved through a hydrothermal (ageing) process and a thermal treatment process, which serve the dual purposes of converting the hydrolysed organo-titanium into a photoactive crystal form of $TiO_2$ while removing the organic component of the template at the same time, with the original pattern of the precursor template remaining intact. This inventive approach greatly simplifies the fabrication process required to obtain a 3-D micro-hexagonal structure. More importantly, any defects in the resultant structure can be dramatically reduced by this new method. This approach also allows for the use of a wide range of functional materials.

DETAILED DESCRIPTION OF THE INVENTION

EXAMPLE 1

Sol-Gel Method

Fabrication of Photoanode

Materials

Figure 1:
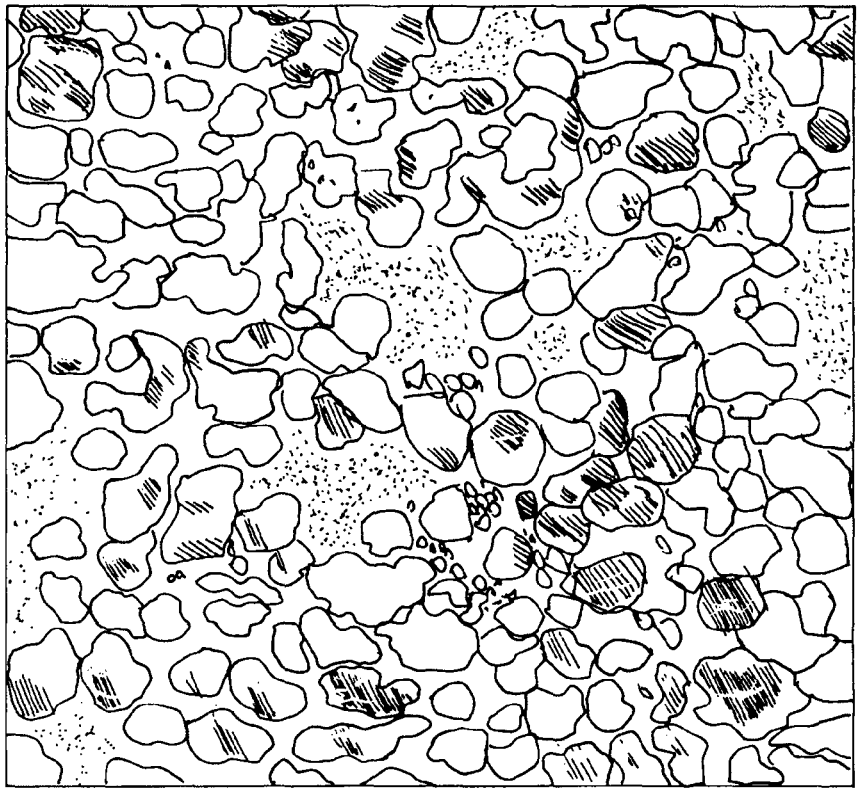
FIG. 1 shows the transmission electron microscope (TEM) images of $TiO_2$ particles before (left) and after (right) autoclaving.
Figure 1:
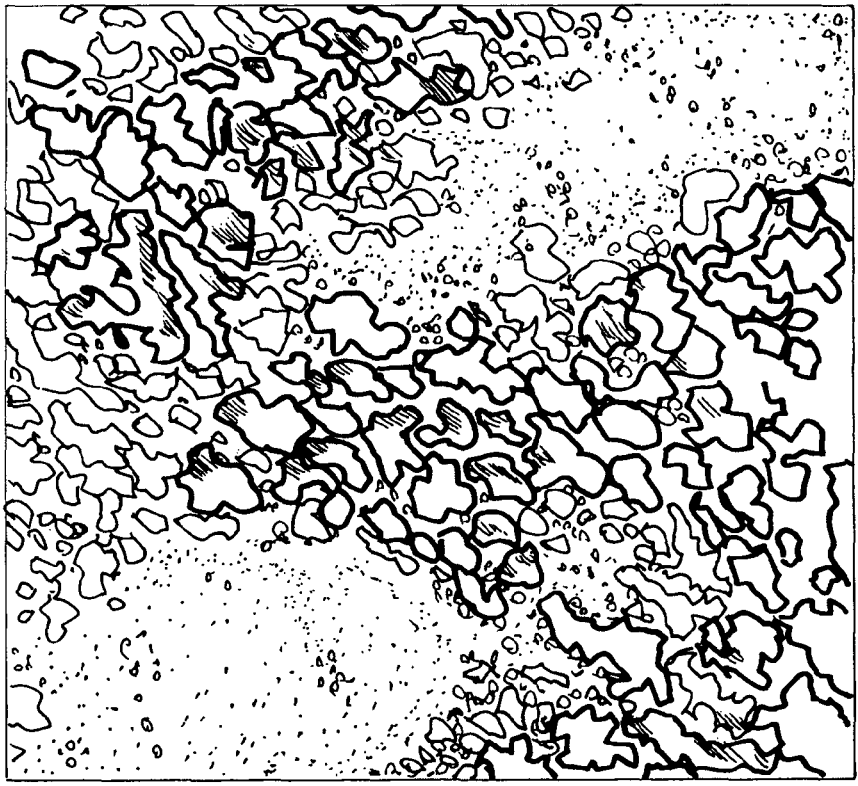

Indium Tin Oxide (ITO) conducting glass slides (5-15 ohm/square) were commercially supplied by Delta Technologies Limited (USA) and used for the conducting substrate. Titanium butoxide (97% purity, Aldrich) and was used as received. All other chemicals were of analytical grade and purchased from Aldrich, unless otherwise stated. All solutions were prepared using high purity deionised water (Millipore Corp., 18 Mohm/cm).

Synthesis of $TiO_2$ Sol

Step 1: Synthesis of $TiO_2$ Colloids (1) Mixture A is prepared by adding 2.0 ml of concentrated $HNO_3$ into 300 ml of distilled water in a 500 ml specially designed Erlenmeyer flask.

(2) Mixture B is prepared by adding 8.0 ml of propan-2-ol into 25.0 ml of titanium butoxide.

(3) Hydrolysis is carried out by drop-wise adding Mixture B into Mixture A under vigorous stirring conditions. The hydrolysed Titania Solution C is the resultant white slurry.

(4) Pectisation is carried out by gradually increasing the temperature of the Solution C to 80° C. via a heating plate. The solution is then maintained under vigorous stirring conditions and a constant temperature of 80° C. for 10 hours, which results in the appearance of a semitransparent colloidal suspension.

(5) Following the pectisation a Filtration process is undertaken with 0.45 micron filter to remove any large solid particles.

(6) The filtered solution is then transferred into a dialysis membrane tube with MWCO (molecular weight cut off) of 12,000-20,000 Da.

(7) Dialysis is performed by placing the loaded dialysis membrane tube into a container filled with 10 L of deionised water (pH=5.5) for between 24 to 48 hours, under constant stirring conditions. During the dialysis process, the deionised water is frequently changed while the pH of the colloidal solution inside the membrane tube is monitored. The process is terminated once the pH of the colloidal solution reaches pH>3.5, preferably, pH=3.8.

(8) The dialysed colloidal solution is transferred into a hydrothermal reactor (thermal-bomb) for hydrothermal treatment.

(9) Hydrothermal Treatment (autoclaving sedimentation) is conducted in a sealed hydrothermal reactor under a constant temperature of 200° C. for over 10 hours, preferably 12 hours, which produces $TiO_2$ colloids ready for the next step of use.

Step 2: Preparation of $TiO_2$ Sol

(10) The hydrothermally treated colloidal solution is concentrated via a vacuum evaporation process below 80° C. to achieve a desired concentration>5% solids, preferably, 6.0% solids.

(11) Thickener such as carbowax is then added to the concentrated solution. The amount added is in accordance with the ratio of (the colloidal weight)/(carbowax)>1% (w/w), preferably, 30% (w/w), which provides the final $TiO_2$ sol solution, ready for immobilisation.

Preparation of Conducting Substrate

(12) ITO conducting glass slides are cut into the desired size and shape.

(13) The substrate was pre-treated by sequential washing with detergent, deionised water, chromic acid washing solution, deionised water and, lastly, pure ethanol. Caution must be taken during the chromic acid washing step to avoid the destruction of ITO conducting layer. The treatment time in chromic acid washing solution should be less than 40 seconds, preferably 15 seconds.

(14) The treated slides are then dried in air in a clean environment, free of dust. A conductivity check must be conducted before the immobilisation, ensuring that there is no noticeable damage to the substrate resulting from the treatment process.

Immobilisation

(15) Immobilisation of colloidal $TiO_2$ onto the treated conducting substrate is carried out via a dip-coating method. The treated ITO slide is placed onto a dip-coating machine and is then immersed in an appropriate quantity of $TiO_2$ sol solution in a suitable container. Coating is achieved by withdrawing the substrate from the $TiO_2$ sol solution at a constant speed, preferably 2 mm/s.

(16) The coated slide is subsequently dried in a dust-free oven at 100° C. for 10 minutes.

(17) The dried slide is placed in a high temperature oven calcined at 450° C. for 30 minutes.

(18) The resultant slide is placed back onto the dip-coating machine.

(19) Repeat process (15) to complete the second layer coating.

(20) Repeat process (16)

(21) The resultant slide with two layers of $TiO_2$ is finally calcined at 700° C. for over 0.5 hours, preferably for 2 hours, which provides the photoanode, ready for use.

Characterisation of $TiO_2$ Colloids

It is known that amorphous $TiO_2$ has no photocatalytic reactivity due to severe structural defects which act as electron/hole recombination centres under illumination. For photoanode fabrication, it is preferable to start with nanoparticles (colloids) which have good crystallinity.

Upon the hydrolysis of the butoxide, a white precipitate of large agglomerates of primary particles is formed immediately. These agglomerates need to be peptised to obtain mono-dispersed particles (colloids), which may also contain non-colloidal forms of titania. These unwanted non-colloidal forms of titania are removed via a dialysis process. The removal of the non-colloidal forms of titania is extremely important as such forms of titania are often very small in size (e.g., an oligomeric form of titania with 2 to 9 Ti atoms), which may have a detrimental effect on the photoactivity of the photoanode produced due to its poor crystallinity, high grain boundary impedance, low connectivity between the crystal grains and photoelectron collection efficiency. Resultant colloidal sizes are ranged from 8 nm to 10 nm, which have been found to be optimal sizes to produce high performance photoanodes. The dialysis process also serves the purpose of regulating the colloidal pH to a desired level. This process stabilises the chemical forms on the colloidal surface, which is beneficial in minimising surface dynamic effects of the photocatalyst. After this process, the resultant particles still may not be well crystallized, perhaps due to the existence of excessive hydroxyl groups and/or non stoichiometric Ti—O—Ti bridging bonds. Therefore, to increase the crystallinity of the $TiO_2$ colloidal particles obtained after hydrolysis and pectisation, the colloidal suspension is subjected to hydrothermal treatment in an autoclave. FIG. 1 shows TEM images of the $TiO_2$ colloids before and after autoclaving. Before autoclaving, the surfaces of $TiO_2$ colloids can be seen to be coarse with particle sizes ranging from 4 nm to 8 nm. The particles are not well crystallized. After autoclaving, however, the images clearly show that the particle surfaces are better defined and nanocrystals are clearly seen with particle sizes now ranging from 8 nm-10 nm.

Characterisation of $TiO_2$ Photoanodes

The $TiO_2$ nanoparticle coated films were calcined in air at different temperatures and for different durations. The purpose of this treatment, on one hand, is to obtain better electric contact between the ITO substrate and the nanoparticles, between the nanoparticles (connectivity), and to improve the mechanical strength and adhesion between the substrate and the $TiO_2$ nanoparticles. On the other hand, the photocatalytic performance of the photoanode can be improved by thermal treatment due to the changes of crystalline texture and enhanced crystallinity and connectivity between the grain particles. The films were calcined at various temperatures between 500° C. and 850° C. and, thereafter, were characterised by x-ray diffraction and SEM.

It was found that the intensity of the diffraction peak of the anatase (101) plane increased as the calcination temperature increased, suggesting an improvement in crystallinity and growth of particle size. A decrease in the half peak width with increasing calcination temperature and calcination time was also observed. This implies an improvement in crystallinity and an increase in the degree of aggregation between primary particles (or growth of the particles) resulting from the increase in calcination temperature and/or calcination time.

The crystallite size can be estimated from XRD line broadening according to the Scherer equation.

The particle size and the phase composition of treated photoanodes calcined at various calcination temperatures are listed in Table 1.

TABLE 1

| Calcination temperature | Particle size (nm) | Phase composition |
|---|---|---|
| 500° C., 0.5 h | 7 | Anatase (100%), rutile (0.0) |
| 600° C., 0.5 h | 10 | Anatase (100%), rutile (0.0) |
| 700° C., 0.5 h | 18 | Anatase (99.9%), rutile (0.1%) |
| 700° C., 2 h | 17 | Anatase (97%), rutile (3%) |
| 700° C., 16 h | 33 | Anatase (96.8%), rutile (3.2%) |
| 750° C., 0.5 h | 24 | Anatase (99.8%), rutile (0.2%) |
| 750° C., 8 h | 33 | Anatase (96.5%), rutile (3.5%) |
| 850° C., 0.5 h | 43 (anatase), 45 (rutile) | Anatase (81.4%), rutile (18.5%) |

Figure 2:
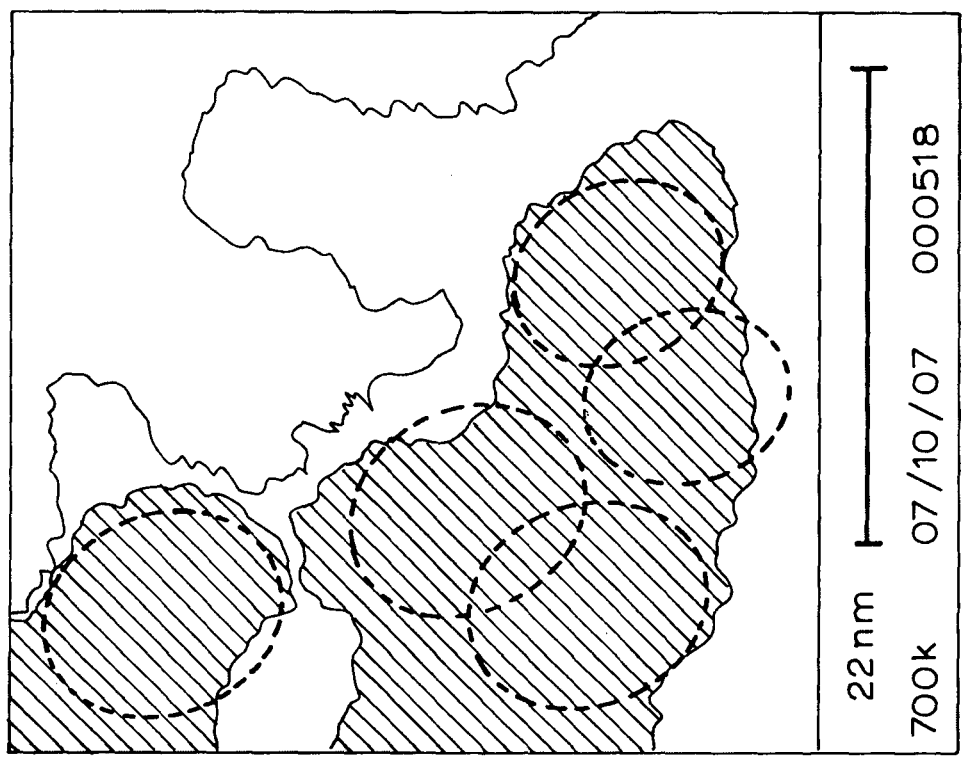
FIG. 2 shows the high resolution TEM (HRTEM) image of a $TiO_2$ photoanode obtained under thermal treatment conditions of 700° C. for 2 hours.

It was found that calcination at 700° C. for 2 hours gives the best crystallinity with the phase composition estimated as 97% Anatase and 3% rutile. The estimated nanoparticle size by XRD is found to be 17 nm. It should be mentioned that the particle size deduced in this way may only serve as a guide to estimate the grain size of primary particles, the particle size of secondary particles and the degree of aggregation among the primary particles in a secondary particle. This is because the crystallinity of primary particles and the degree of aggregation between primary particles in a secondary particle affects the intensity of diffraction peaks. In order to further demonstrate this, HRTEM was employed to directly access the level of crystallinity and the particle size. FIG. 2 shows the HRTEM image of the resultant photoanode after thermal treatment at 700° C. for 2 hours. The image reveals a very clearly defined (101) plane with an almost perfect crystalline line (i.e., distance between the atom layers of 101 planes within each crystal grain particle), indicating high crystallinity. The image also shows that the primary particle sizes are from 7 nm to 10 nm, i.e., close to the original colloidal size.

Figure 5:
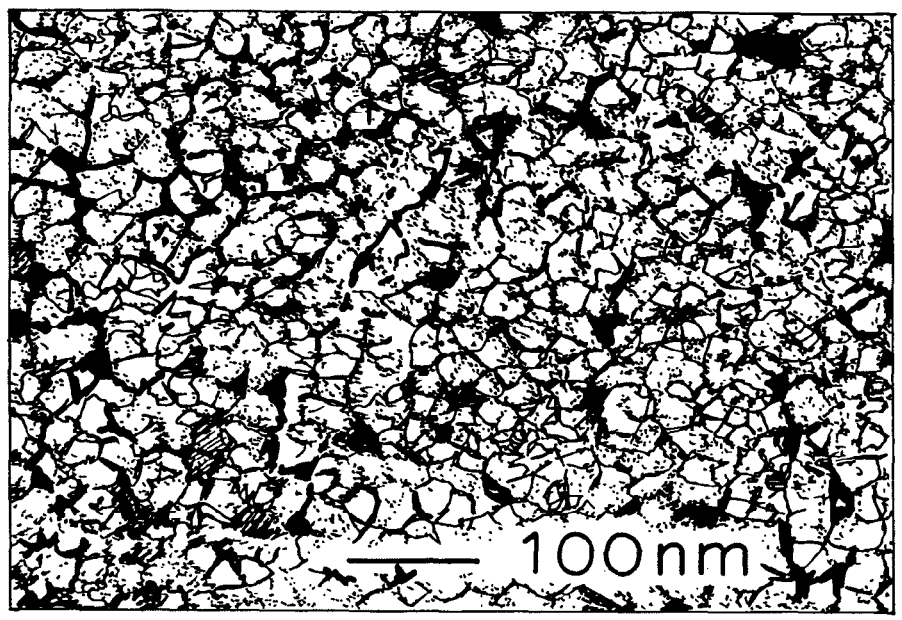
FIG. 5 shows high resolution field emission scanning electron microscope (HRFESEM) image of a $TiO_2$ photoanode obtained under thermal treatment conditions of 700° C. for 2 hours.

The surface morphology of the resultant photoanode treated calcined at 700° C. for 2 hours was examined by HRFESEM (see FIG. 5). A surface morphology with a highly porous nanostructure is observed. The shape of the primary particles (similar to colloidal particles) can be observed. The size of the secondary particles was found to be very similar, ranging from 20 nm to 40 nm. Interestingly, the size deduced from X-ray diffraction is similar to the size of the secondary particles observed in the SEM images. Based on the above microscopy and XRD information, it can be inferred that the change of particle size deduced from XRD reflects the degree of aggregation and crystallinity between primary particles in the aggregates.

Photoelectrochemical Characteristics

The saturation photocurrent ($I_{sph}$) obtained from the blank electrolyte solution indicates the rate of photocatalytic oxidation of water. It was found that when the photoanodes were calcined with temperatures below 600° C., the $I_{sph}$ resulting from water oxidation remains virtually unchanged with calcination temperature, indicating that there is similar photocatalytic activity towards water oxidation. For those photoanodes calcined at temperatures above 600° C., an increase in the electrode calcination temperature results in an increase in the Isph, indicating the photocatalytic efficiency towards water oxidation is enhanced. The increase in the Isph for electrodes calcined above 600° C. is therefore unlikely to be due to changes in crystallinity and/or the degree of aggregation between primary particles. Instead, the change of $I_{sph}$ with calcination temperature appears to coincide with the change in crystalline form. As shown in Table 1, a rutile phase exists when the electrode is calcined at 700° C. (although only a slight amount) and the percentage of the rutile phase increases as the calcination temperature further increases. It is known that the photocatalytic evolution of oxygen from water oxidation is faster for the $TiO_2$ rutile phase than for the anatase phase of $TiO_2$. The results described herein confirm that the rutile phase of $TiO_2$ is much more active than the anatase form towards the photocatalytic oxidation of water when a sacrificial electron acceptor is used.

Figure 3:
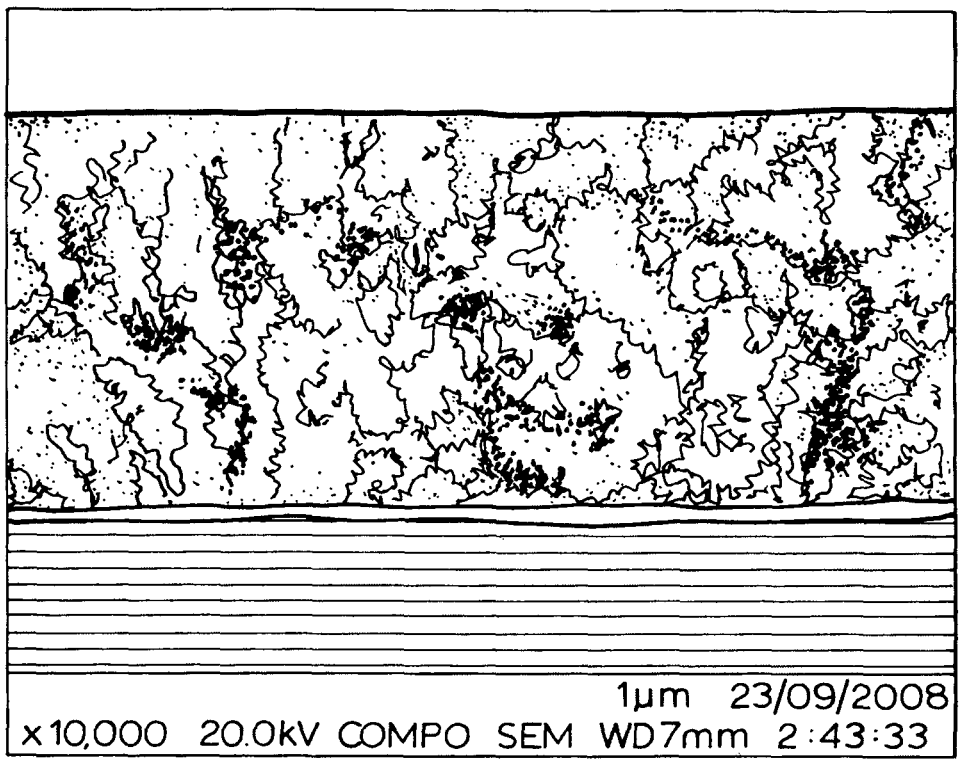
FIG. 3 shows a cross-sectional SEM image of a $TiO_2$ film formed from a colloidal suspension at pH 3.75. Its estimated thickness is about 5 microns. The film appears to be formed from particles approximately 50 nm in size.
Figure 4:
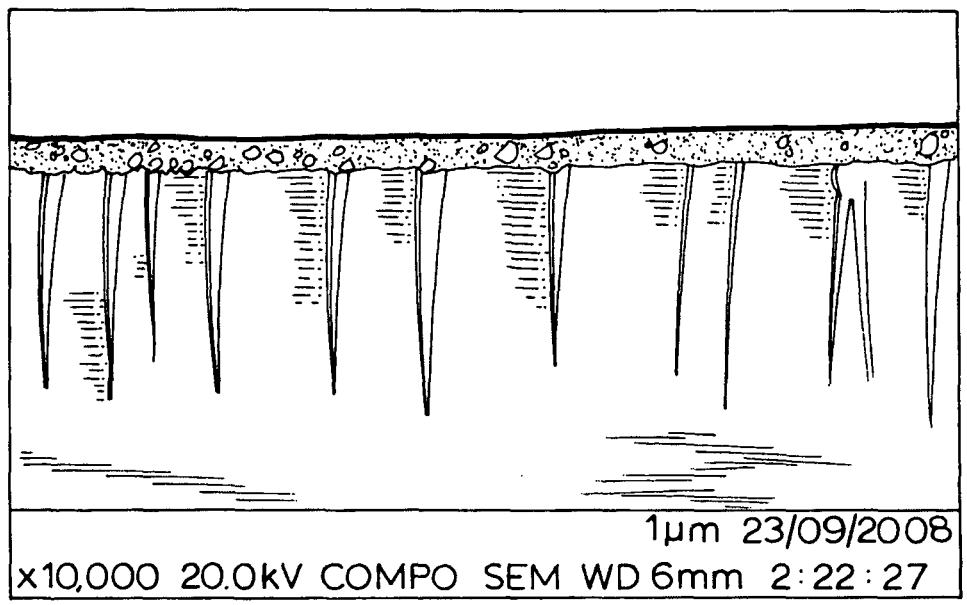
FIG. 4 shows a cross-sectional scanning electron microscope (SEM) image of $TiO_2$ film formed from a colloidal suspension at pH 3.85. The film's estimated thickness is between 400 nm and 600 nm. The film appears to be formed from particles approximately 50 nm in size.

The underlining mechanism for this enhancement of water oxidation may be due to the fact that the rutile phase can facilitate the combination of surface bound hydroxyl radicals to form $O_2$ molecules. The fact that adsorption of oxygen on the anatase form of $TiO_2$ is easier and the adsorption amount is larger (than for the rutile form) supports this argument. Another possibility, or in addition to the above, concerns the coexistence of both rutile and anatase forms (which have different band gaps) on the same electrodes. Contact between the two phases may facilitate the temporal and spatial separation of the photogenerated electron/hole pairs and so increase the lifetime of these electron/hole pairs. It has been well documented that coupling semiconductors of different band gaps can improve the photocatalytic reactivity of a photocatalyst by prolonging the lifetime of photoelectron and photohole pairs. Several $TiO_2$ photoanodes prepared according to the sol-gel method disclosed above were tested in the laboratory for their functional lifetime with the purpose of analysing COD in water samples according to the method disclosed in patent specification WO 2004/088305. One photoanode sensor successfully analysed samples every ~10 minutes for a total of >3000 samples over a continuous period of more than 2 weeks before eventually failing due to mechanical erosion of the $TiO_2$ film. An SEM profile of a photoanode prepared in the same manner is shown in FIG. 4. A second photoanode was similarly tested. The second photoanode analysed ~6500 water samples at ~10 minute intervals over a period of over 5 weeks before failing, An SEM profile of a photoanode prepared in the same way is shown in FIG. 3. Note that these two sensors were members of two different preparation batches, and were produced slightly differently (mainly with respect to pH), but within the range of fabrication parameters outlined above. This has resulted in different $TiO_2$ layer thicknesses and morphologies as is evident in FIGS. 3 and 4.

Photocatalytic Oxidation of Organics

Figure 6:
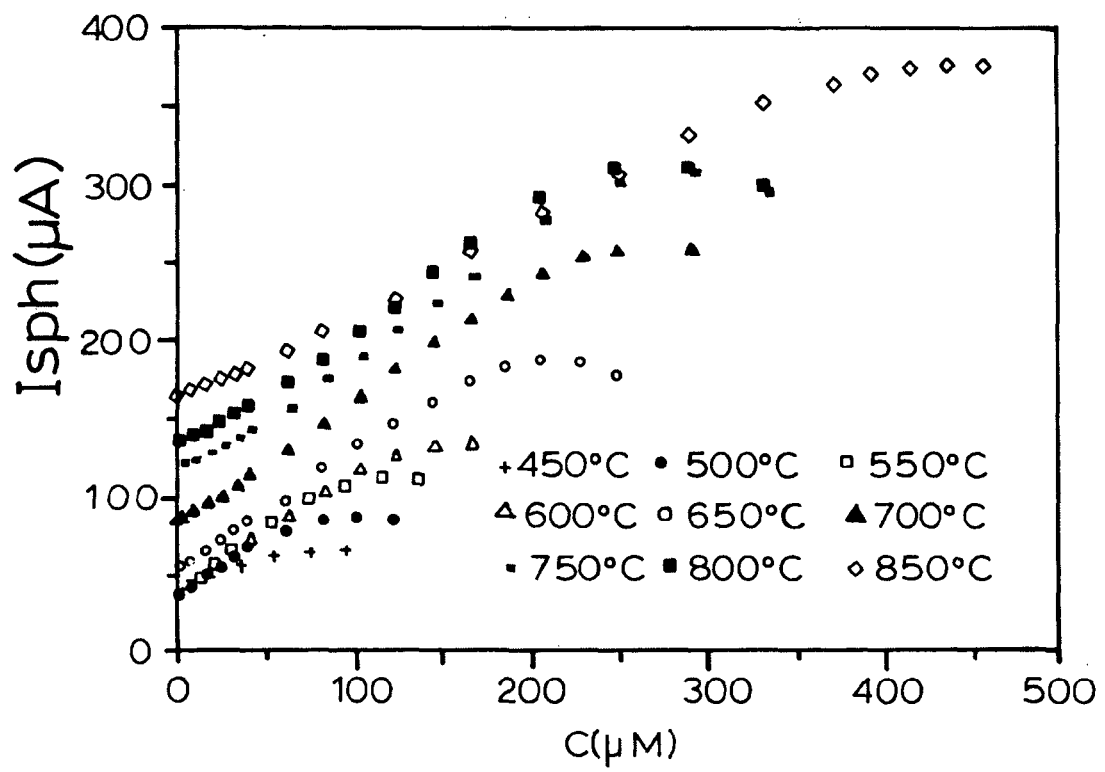
FIG. 6 shows the saturation photocurrent dependences on the concentration of potassium hydrogen phthalate for electrodes that have been calcined at various temperatures for a half hour, with the number in the graph representing the calcination temperature.

When potassium hydrogen phthalate was present in the solution, the photocurrent obtained increased with the applied potential bias in the low potential range, and reached saturation at higher applied potentials. The saturation photocurrent ($I_{sph}$) at higher potentials reflects the maximum photohole capture rate at the $TiO_2$ surface, which, in turn, is determined by the concentration of potassium hydrogen phthalate (C) in the solution. The effect of photoanode calcination temperature on the Isph was investigated. FIG. 6 shows $I_{sph}$-C relationships for electrodes calcined at various temperatures. In all cases, $I_{sph}$ increases almost linearly with potassium hydrogen phthalate concentration at low concentration (i.e. <50 uM). This linear increase in saturation photocurrent can be ascribed to the mass transfer limitation of the organic compound, as evidenced by the increase in photocurrent upon stirring the solution. $I_{sph}$ tends to reach saturation at higher potassium hydrogen phthalate concentrations, but in some cases decreases slightly due to an inhibition effect. The intercepts on photocurrent axis represent the blank saturation photocurrents ($I_{blank}$) generated from the blank electrolyte solution due to the photooxidation of water. These blank saturation photocurrents remained constant for electrodes that were calcined at temperatures below 600° C. and increased for those electrodes calcined at temperatures above 650° C.

Interestingly, for electrodes calcined at temperatures below 600° C., though the blank saturation photocurrent stays virtually unchanged, the linear range of $I_{sph}$-C curves is extended as the electrode calcination temperature is increased. Under illumination at the same light intensity, the difference in the maximum saturation photocurrent reflects the difference in the capture of photo-holes by water and potassium hydrogen phthalate at the $TiO_2$ surface. As discussed above, the electrodes calcined at these temperatures are composed of only the anatase form of $TiO_2$ and the only physical parameters changed among these electrodes are the degree of aggregation between particles and the increase in crystallinity. Therefore, it is more likely that the better crystallinity and connectivity between particles are responsible for the extended linear range—especially given that such improvements can decrease the degree of photoelectron/hole pair recombination before they are captured by the strong, multi-electron transfer adsorbates. The fact that amorphous $TiO_2$ possesses only slight photocatalytic reactivity due to the large number of surface and structural defects supports this argument.

For electrodes calcined at higher temperatures, it was found that not only the photohole capture rate by water is enhanced but also the maximum $I_{sph}$ ($I_{sphM}$) with respect to potassium hydrogen phthalate concentration is greatly enhanced—indicating an improvement in photocatalytic activity. For electrodes calcined at 850° C., the slope of the linear part of $I_{sph}$-C curve observed was lower than that observed for electrodes calcined at lower temperatures. This is probably due to the low porosity of the film, which lowers the surface area of the electrode.

In order to maximise photo-efficiency in applications such as photocatalytic mineralisation of organic pollutants in a water sample, the photoanode should demonstrate lower photocatalytic activity towards water, but higher photocatalytic activity towards the degradation of organic compounds. Unfortunately, as the calcination temperature increases, both the photocatalytic activity toward potassium hydrogen phthalate and the photocatalytic activity toward water are found to increase. Therefore a compromise between these two conflicting factors is required. To further look at the effect of calcination temperature on photocatalytic activity towards phthalic acid, a parameter reflecting the activity without the influence of water oxidation is required. At a given light intensity, when the saturation photocurrent reaches its maximum in the high potassium hydrogen phthalate concentration range, the overall photocatalytic oxidation process is no longer under mass transfer control, instead, surface reactions control the overall process. This means that the $I_{sphM}$ obtained at high concentrations reflects the reactivity of the photoanode toward the organic compound. However, the problem of using $I_{sphM}$ to accurately represent the reactivity of the electrode towards the organic compounds is that the $I_{sphM}$ so measured does not purely result from the oxidation of organic compound. A component of photocurrent (blank photocurrent) due to the oxidation of water is also included and the magnitude of this component varies with electrode type. Therefore, in order to better present the electrode reactivity, a net maximum $I_{sphM}$ is defined as:

$$\Delta I_{sphM} = I_{sphM} - I_{blank}.$$

Since for a given electrode, $I_{blank}$ is constant, therefore, $\Delta I_{sphM}$ represents the maximum photocurrent that is due purely to the photocatalytic oxidation of organic compound. The reactivity of the electrode can then be represented by plotting $\Delta I_{sphM}$ against the electrode calcination temperature $\Delta I_{sphM}$ increases almost linearly with electrode calcination temperature up to 750° C., indicating an increase in electrode reactivity. However, a further increase in the electrode calcination temperature results in a decrease in the $\Delta I_{sphM}$ indicating a drop in the electrode.

Several characteristics of $TiO_2$ films may be changed when the electrode is subjected to different calcination temperatures. These changes in the film parameters may have conflicting influences on the photocatalytic reactivity of the resultant electrodes. For example, the surface area drop that is caused by increasing calcination temperature usually decreases photocatalytic reactivity. However, the better crystallinity and a degree of sintering between particles that are achieved at higher calcination temperatures are favourable for photocatalytic reactivity. It seems that the $\Delta I_{sphM}$ increase for the photoanodes calcined between temperatures in the range 450° C. to 600° C. can be attributed largely to the improvement in connections between particles and in the level of crystallinity of the particles. Beyond these calcination temperatures, the $\Delta I_{sphM}$ increase may partially be due to the further improvement in connections between particles and crystallinity, but mainly due to composition changes (i.e. increase in the amount of the rutile phase).

The large $I_{sph}$ obtained for high temperature treated electrode (i.e. that produced at 850° C.) was not due to the high photoanode reactivity towards the oxidation of organic compound, instead, it was due to large $I_{blank}$, which suggests that the high temperature treated electrode possesses high reactivity towards the oxidation of water.

Inhibition Effect

In analysing for COD, the photoanode requires high oxidation power to be capable of mineralising a wide-spectrum of organic compounds in a non-discriminating manner. As COD is an aggregative parameter it should accurately reflect the collective effects of all pollutants. It was found that different photoanodes have different oxidation characteristics towards different organic compounds. The crystal phase and the ratio between the anatase and rutile phases appear to be two important factors affecting the oxidation characteristics of the photoanodes. These factors are mainly determined by fabrication conditions, as demonstrated above, in particular, by the final thermal treatment temperature. Therefore, the effect of crystal phase on the oxidation characteristics of the photoanodes has been investigated.

It is known that a photoanode thermally treated with temperature below 500° C. will consist purely of an anatase phase. This type of photoanode is found to possess high photoactivity towards simple non-aromatic compounds; i.e., it is capable of fully oxidising (mineralising) simple organic compounds. However, it has also been found that photoanodes of such kind are incapable of mineralising aromatic compounds. The photoanode can be easily deactivated (inhibited) by the presence of aromatic compounds. Therefore, three model compounds were selected for this study, including phthalic acid, salicylic acid and o-cholorophenol; each having different functional groups. Both phthalic acid and salicylic acid are known to be strongly adsorbed to a $TiO_2$ surface, while o-cholorophenol is a weak adsorbent. It was found that the net photocurrent linearly increases with concentration within a very low concentration range. A maximum net photocurrent was reached around 75 μM and then decreased (instead of levelling off) as the concentration was further increased. This decrease in net photocurrent with increased concentration is due to the inhibition effect, which results from the accumulation of un-reacted organics (or their reaction intermediates) at the active sites of the photocatalyst which then results in deactivation of these sites.

Photoanodes thermally treated at 700° C. for 2 hours was found to give the best crystallinity with the phase composition estimated as 97% anatase and 3% rutile. In a water sample, at low organic concentration range, linear relationships between the net photocurrent and the concentration were observed. However, at higher concentrations, the net photocurrent decreased slightly after reaching a maximum, indicating that slight surface deactivation may have resulted from the aromatic compounds. This is in contrast to results obtained from photoanodes calcined at 500° C. where a considerable inhibition effect was observed for aromatic compounds. More importantly, the linear range (i.e., the inhibition-free range) observed for the high temperature treated photoanodes was more than 5 times larger than that observed using the lower temperature treated photoanodes. This indicates that the high temperature calcined photoanodes have greater photocatalytic activity which enables the completely mineralisation of more complicated organic compounds. The apparent reason for this result is due to the high temperature treated photoanode consisting of mixed phases of anatase and rutile, which may then generate a synergetic effect. The $E_g$ for anatase (3.2 eV) is 0.2 eV higher than that of rutile (3.0 eV). This creates an additional motive force to facilitate the separation of photoelectrons from photoholes, and so suppress the recombination and prolong the lifetime of photoholes to permit more effective photo-oxidation.

The performance of the photoanode fabricated under the optimal conditions was tested and evaluated under exhaustive degradation conditions as previously described in WO2004/088305.

As previously proposed, the analytical principle for determination of COD employing the exhaustive degradation mode can be expressed by Equation (1):

$$COD \text{ (mg/L of } O_2) = \frac{Q_{net}}{4FV} \times 32000 \quad (1)$$

where the $Q_{net}$ is the net charge originating from photocatalytic oxidation of organic compounds, which can be obtained experimentally. The volume, V, is a constant with known value for a given photoelectrochemical cell. F is the Faraday constant. The Equation (1) is applicable for COD determination, but only if full mineralisation s and 100% electron collection efficient are achieved. This means that a photoanode that is suitable for COD measurement applications must meet these requirements. The extent of degradation (mineralisation) and the photoelectron collection efficiency of the photoanode was therefore collectively examined by comparing COD values using the method described in WO2004/088305 (measured COD) and the theoretical COD.

This method measures essentially the theoretical COD value, which is achieved only when all organic compounds in the sample are completely mineralised and, at the same time, when 100% of the photocatalytically generated electrons originating from the degradation are collected.

A theoretical detection limit of 0.05 ppm COD was obtained from 27 repetitive injections of synthetic samples and was calculated based on a 3σ signal to noise ratio. However, the practical detection limit (i.e., the real detection limit) obtained from synthetic samples (using KHP) was found to be 0.40 ppm COD with a relative standard deviation, RSD %=±15%. Linear range experiments were carried out using glucose-based synthetic samples. A linear upper range of 350 ppm COD was observed for the thin-layer photoelectrochemical cell which was employed under normal light intensity (i.e., at 75% of full intensity capacity). When full light intensity (100%) was used, an upper linear range of 560 ppm was achieved.

Reproducibility was evaluated by performing 96 consecutive analyses for a sample containing 20.0 ppm COD equivalent glucose over a 48 hour period. The relative standard deviation thus obtained was ±0.96%.

Additionally, the stability of the photoanode was tested using a number of injected samples and also over the period of use. The test sample used was a 20.0 ppm COD equivalent glucose-based water sample. It was found that no noticeable change in the determined COD values (20.0±1.0 ppm) occurred after 446 consecutive analytical cycles conducted within a 7 day period. Longer-term stability was also examined over a 3 week period with 5 injections each day. Again, it was found that there was no noticeable change in the determined COD values over the tested period.

Preconditioning of the photoanode is often carried out by pre-running standard synthetic samples until the system is demonstrated to be stable and that analytically useful data can be obtained. However, this can cause a practical problem in common applications for any commercial instrument. Therefore, an investigation was conducted assess whether the need for a preconditioning process before use might be eliminated. The investigation revealed that a photoanode with stable surface properties can be obtained when it was fabricated using the newly developed method, described above. It was found that the surface stability of the resultant photoanode can be remarkably improved if the smaller colloidal particles are removed and the pH of the colloidal solution is regulated to a desired value (pH=3.8), during the synthesis of the $TiO_2$ sol. This can be achieved by introducing a dialysis process during the synthesis processes.

EXAMPLE 2

Breath Figure Method

Materials

Indium Tin Oxide (ITO) conducting glass slides (8 ohm/square) were commercially supplied by Delta Technologies Limited (USA) and used for the conducting substrate. Polystyrene monocarboxy terminated (CTPS, MW=30,000) was purchased from Science Polymer Inc and used, as received. Titanium tetraisopropoxide (TTIP, 97%) and chloroform (99%) were obtained as commercial products from Sigma-Aldrich. All other chemicals were of analytical grade and purchased from Aldrich unless otherwise stated. All solutions were prepared using high purity deionised water (Millipore Corp., 18 Mohm/cm).

Synthesis Procedures

Figure 7:
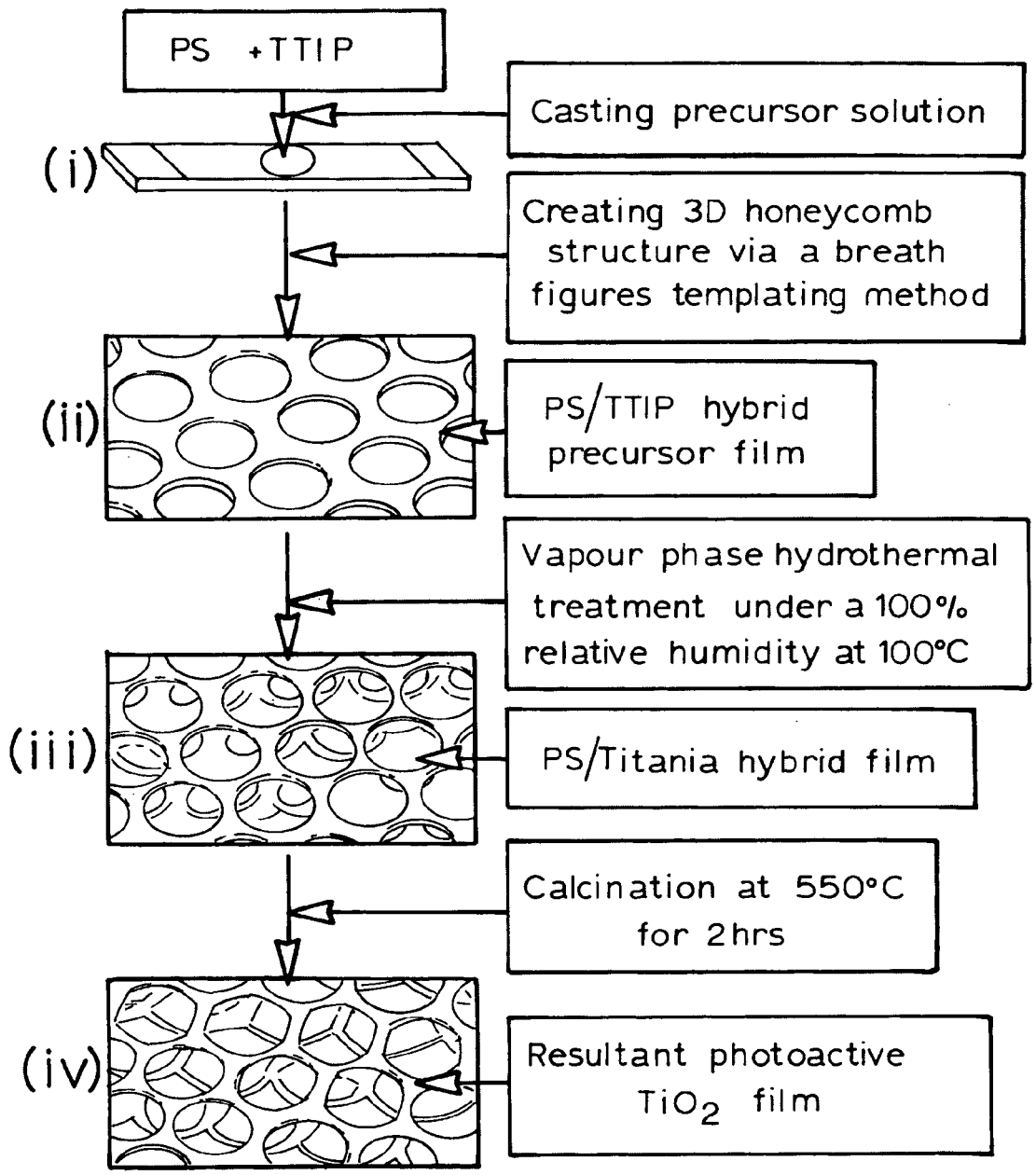
FIG. 7 is a schematic illustration of a second embodiment of the invention in transforming an organic/inorganic hybrid film into a pure inorganic film.

FIG. 7 schematically illustrates the preparation and transformation of a 3D honeycomb architecture hybrid film of monocarboxy terminated polystyrene (CTPS) and titanium tetraisopropoxide (TTIP) into a pure $TiO_2$ film. The breath figure templating method was employed to create a large 3D honeycomb architecture.

Step 1: Preparation of Hybrid Precursor Template

Preparation of Conducting Substrate (1) ITO conducting glass slides are cut into the desired size and shape;

(2) The substrate is pre-treated by washing in turn with detergent, deionised water, acetone, deionised water and, lastly, with pure ethanol via ultrasonication;

(3) The treated slides are dried in air in a clean environment that is free of dust.

Preparation of Template Formation Solutions (4) Different amounts of polystyrene monocarboxy terminated copolymers (preferably, 50 mg) were dissolved in 5.0 ml of chloroform via ultrasonication for 5 minutes;

(5) Different amounts (preferably, 26.6 μl) of titanium tetraisopropoxide were added into the above copolymer solutions via ultrasonication for 5 minutes. This resulted in transparent solutions (Template formation solution: A).

Precursor Template Formation (6) The pre-treated ITO substrate was placed in a specially designed reaction chamber;

(7) Different amounts (preferably, 30 μl) of Solution A were cast onto the substrate by micropipette;

(8) $N_2$ gas with humidity controlled within the range of 50 to 100% (preferably, 83.2%) was immediately blown vertically onto the substrate surface while at a constant temperature of 23° C. for 1 to 20 min (preferably for 8 min). The humidity was monitored by a hygrometer.

(9) After the cast solution was solidified (due to the solvent evaporation) a uniform thin film (white in colour) formed. This is used as the hybrid precursor template.

Step 2: Converting the Hybrid Precursor Template into Photoactive $TiO_2$ Photoanode Aging Treatment (Hydrothermal Treatment)

(10) The obtained hybrid precursor template was placed onto a specially designed shelf in a sealable hydrothermal reaction chamber. A small water container filled with sufficient amount of pure water was also placed in the chamber;

(11) After the chamber was sealed, it was placed in an oven at a constant temperature between 50° C. and 130° C. (preferably at 100° C.) for between 5 and 170 hours (preferably for 72 hrs) under 100% humidity;

Converting the Hybrid Template into Photoactive 3-D Micro-Hexagonal $TiO_2$

(12) The hydrothermally treated (aged) template was removed from the hydrothermal reaction chamber;

(13) The template was placed in a high temperature oven at a constant temperature of 550° C. for 0.5 to 5 hours (preferably for 2 hours). This produced a nearly transparent photocatalytically active $TiO_2$ film with highly ordered 3-D micro-hexagonal structure.

Structural and Morphological Characteristics

The CTPS/TTIP hybrid film exhibits a typical breath figure pattern, because it shares the same formation mechanism. Although CTPS acts as the structural directing agent to determine the shape and distribution of the breath figure pattern, TTIP does play an important role altering the film formation criteria and the dimensional parameters of the breath figure pattern. At the beginning, both CTPS and TTIP molecules are evenly distributed in the precursor solution. However, during the breath figure formation process, CTPS self-assembly occurs once water condensation takes place (which is caused by the rapid evaporation of chloroform). Under such conditions, hydrolysis of TTIP simultaneously occurs and the TTIP can be partially (see Equation (2)) or completely (see Equation (3)) hydrolysed, depending on the level of water availability:

$$Ti[OCH(CH_3)_2]_4 + 2H_2O \rightarrow Ti(OH)_2[OCH(CH_3)_2]_2 + 2HOCH(CH_3)_2 \quad (2)$$

$$Ti[OCH(CH_3)_2]_4 + 4H_2O \rightarrow Ti(OH)_4 + 4HOCH(CH_3)_2 \quad (3)$$

These reactions occur mainly at locations such as the interfaces between the moisturised $N_2$ gas and the precursor solution, and/or between water droplets and the precursor solution, where water is abundant. Hydrolization products of TTIP are hydrophilic and can be accumulated at these water abundant locations, leading to uneven distribution of titanium. In addition, the hydrolization products of TTIP may also be attracted to the hydrophilic end of the CTPS. These hydrophilic ends will be oriented towards the water abundant interfaces/locations during the self-assembly process, which should attract more of the TTIP hydrolysed products to such places. As a result, the water abundant interfaces/locations become rich in the titanium source when film solidification is completed. This reflects on the resultant structure where the top of the walls (frames) around the pores are noticeably thicker. The effect of TTIP on the resultant structure could also be attributed to partial condensation of TTIP hydrolization products.

The condensation/polymerisation reactions (see Equations (4) and (5)) can lead to the formation of titania networks/clusters via Ti-oxo bridges, altering the CTPS arrangement.

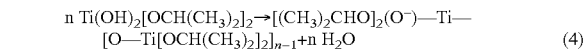

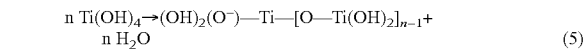

Detailed investigation revealed that the critical criteria for formation of defect-free periodic honeycomb structured CTPS/TTIP hybrid films are: (i) the concentration of CTPS in the precursor solution>5 mg/mL; (ii) the ratio (w/w) between CTPS and TTIP>1.5:1; (iii) 100 mL/min<$N_2$ flow rate<500 mL/min, with a relative humidity greater than 60%. The pore size varies from 3.5 to 8 μm, depending upon the above parameters. It should be mentioned that the effect of breath figure experimental parameters on the pore size of CTPS/TTIP hybrid films differs from the formation of pure CTPS films. Adding TTIP into the precursor solution results in larger pore sizes compared to a pure CTPS film obtained using the same CTPS concentration precursor solution. However, for a given CTPS concentration, a decrease in the ratio of CTPS/TTIP leads to a decrease in the pore size, though the resultant pores are still larger than that of pure CTPS films. For a given TTIP concentration, it was found that a change in CTPS concentration has little effect on the pore size of the resultant hybrid films. For pure CTPS film formation, an increase in the flow rate normally leads to a decrease in the pore size, while pore size of the CTPS/TTIP hybrid films was found to be almost insensitive to the change of flow rates within the range of 100 to 500 mL/min.

Effect of Titanium Tetraisopropoxide (TTIP) Concentration

The effect of titanium tetraisopropoxide (TTIP) concentration (original Ti concentration) was investigated (see FIG. 8). The concentration of the structure directing reagent, carboxy terminated polystyrene (CTPS) was kept constant at 10 mg/ml, while the TTIP concentration was varied from 0 to 10 mg/ml. $N_2$ gas, saturated with 70% humidity, was used to create the breath figures. The flow rate was 200 ml/min at 1 atm pressure.

Figure 8A:
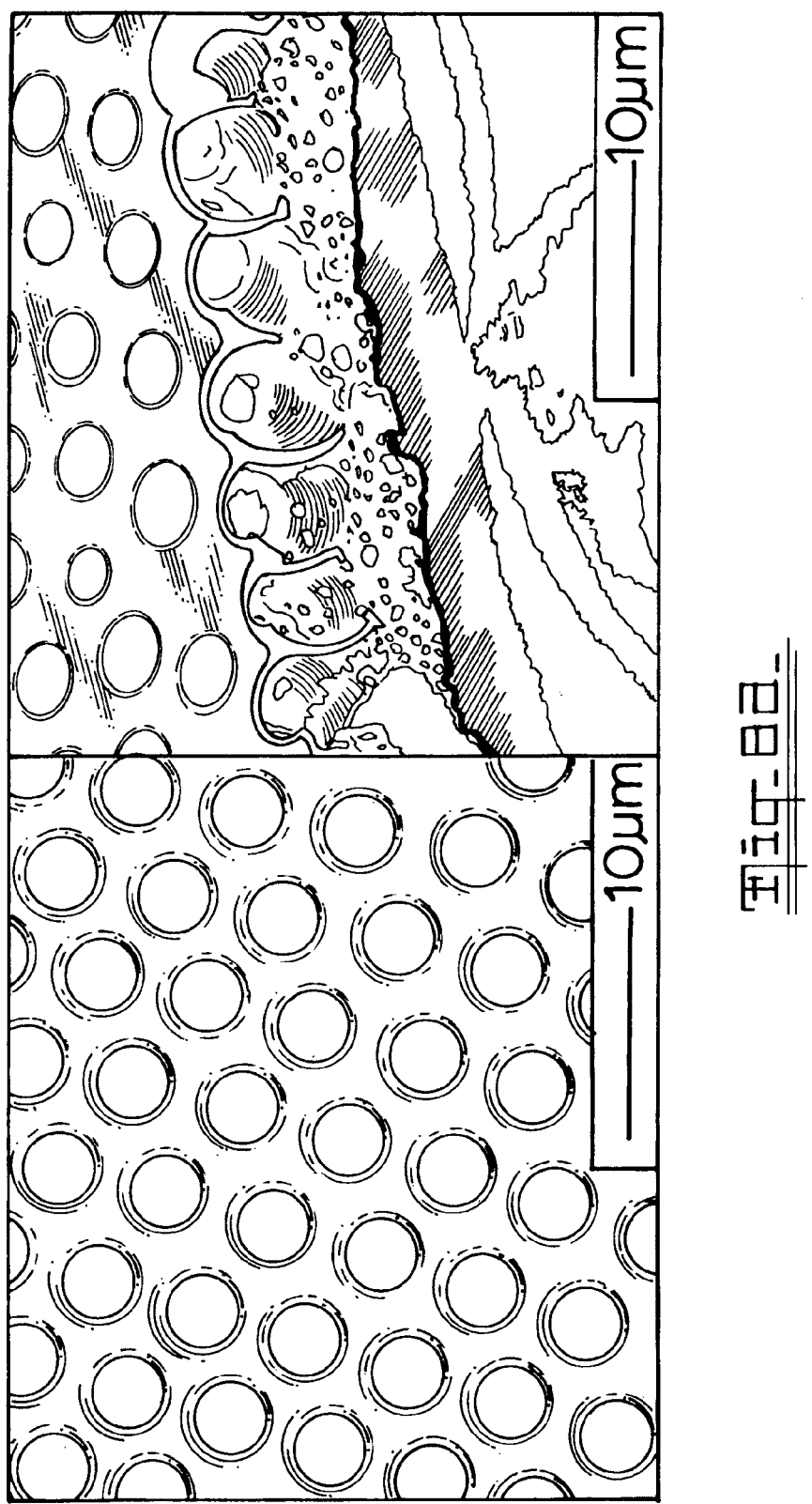
FIG. 8 shows the effect of TTIP concentration on the resultant microstructures. The concentration of carboxy-terminated polystyrene (CTPS) was fixed at: 10 mg/ml. The concentration of TTIP for (a): 0 (pure CTPS); (b): 1.0 mg/ml; (c): 2.5 mg/ml; (d): 5.0 mg/ml and (e): 10.0 mg/ml. Flow rate of 70% humidity $N_2$ gas: 200 ml/min.
Figure 8B:
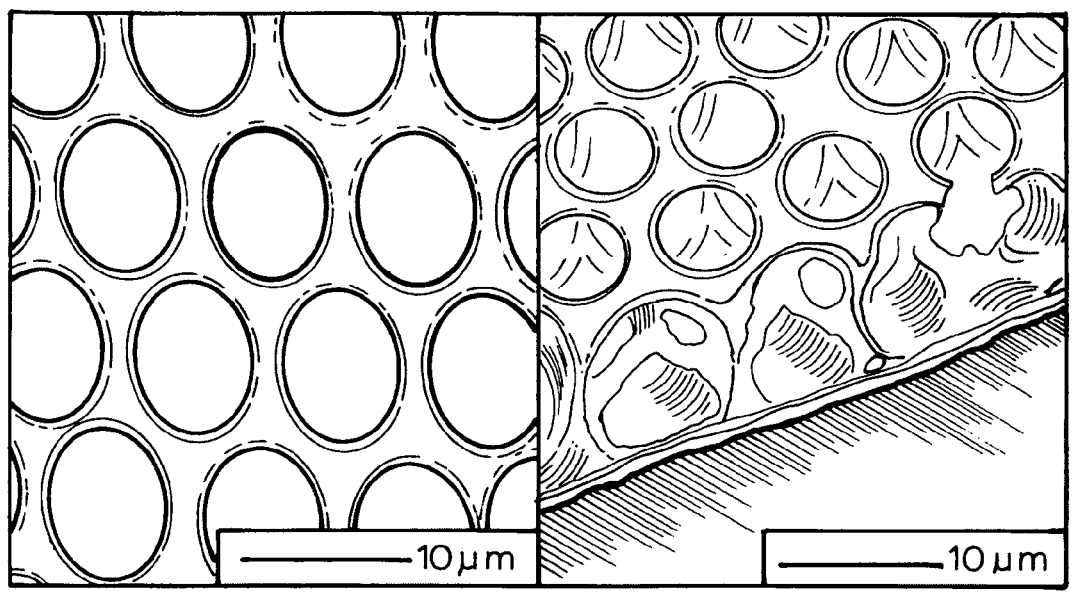
Figure 8C:
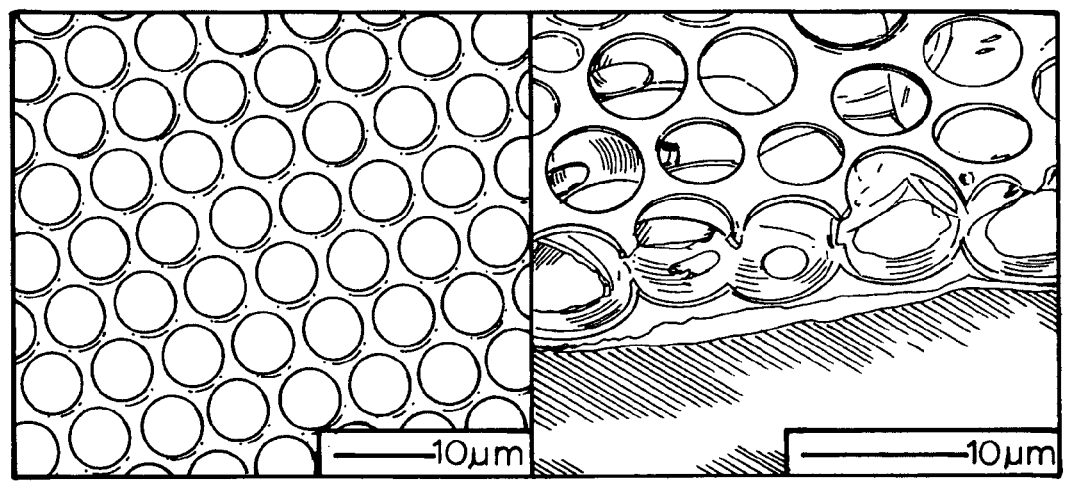
Figure 8D:
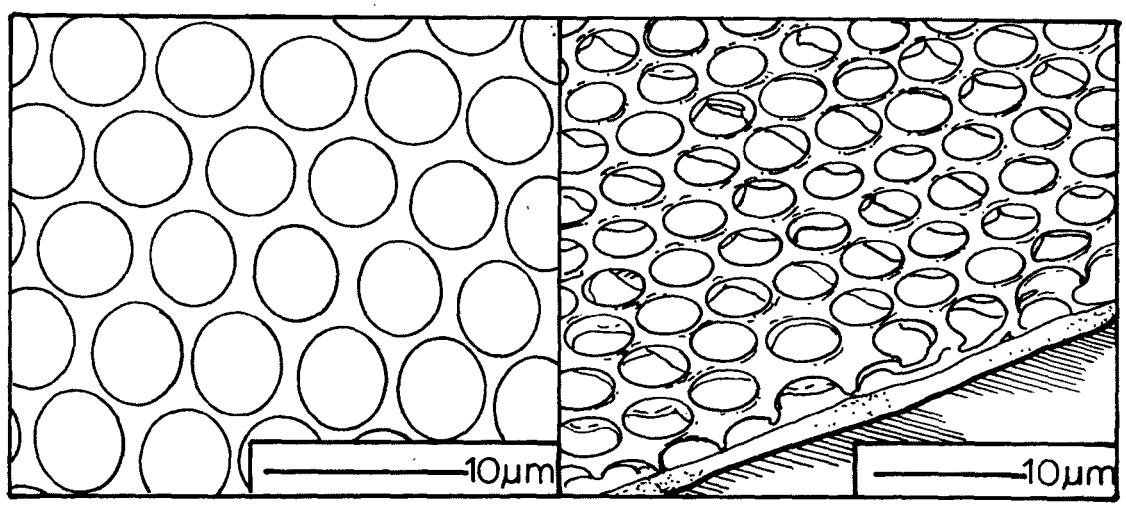
Figure 8E:
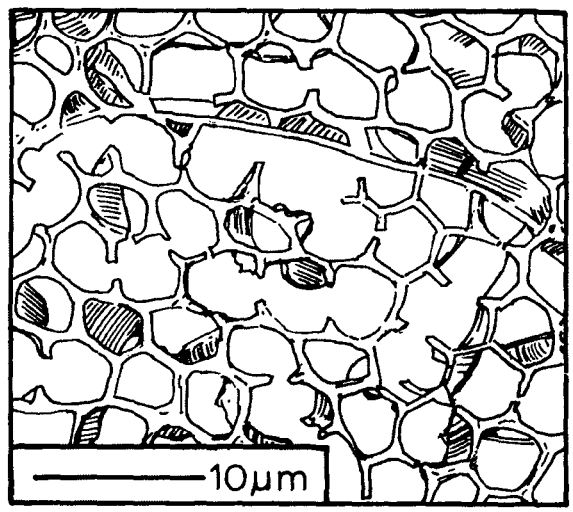

FIG. 8(a) shows the top and cross-section SEM images of the resultant breath figures without the presence of TTIP (i.e., pure CTPS). A nearly perfect honeycomb-like microstructure was created with uniform micro-pore diameter of 3.3 μm and the film thickness of 6.6 μm. This result is in line with previous reported structures produced under similar experimental conditions.

FIGS. 8(a) to (e) show the top and cross-section SEM images of the resultant breath figures with the presence of different concentrations of TTIP. The images reveal that the honeycomb-like breath figures are also formed in the presence of TTIP. However, the dimensional parameters of the microstructures are clearly influenced the TTIP concentration. With 1.0 mg/ml of TTIP (the concentration ratio of TTIP/CTPS=0.10), a micro-pore diameter of 6.4 µm is found, with a thickness of 6.3 µm (see FIG. 8(b)). By comparison with the pure CTPS solution example (FIG. 8(a)), the resultant micro-pore diameter is almost doubled while the thickness decreases slightly. A further increase in the TTIP concentration to 2.5 mg/ml (the concentration ratio of TTIP/CTPS=0.25) results in a micro-pore diameter of 4.1 µm with a thickness of 5.7 µm (see FIG. 8(c)). In this case, the micro-pore diameter has been increased in comparison to the pure CTPS case, but decreased when compared with 0.1 mg/ml TTIP case, while the thickness was further reduced. It was found that a further increase in the TTIP concentration to 5.0 mg/ml (the concentration ratio of TTIP/CTPS=0.50) had no significant influence on the micro-pore diameter (4.0 µm), however, the thickness was further reduced to 5.7 µm (see FIG. 8(d)). Structural deformation was observed for the TTIP concentration of 10.0 mg/ml (the concentration ratio of TTIP/CTPS=1.0). This suggests that for any given CTPS concentration, it can only hold a certain concentration (or TTIP/CTPS ratio) of TTIP for successful pattern formation. A structural deformation occurs beyond such a critical TTIP concentration (or TTIP/CTPS ratio).

Effect of Monocarboxy Terminated Polystyrene (CTPS) Concentration

The effect of the concentration of the structure-directing agent, monocarboxy terminated polystyrene (CTPS) on the resultant breath figures was investigated (see FIG. 9). The concentration of TTIP was kept constant at 4.0 mg/ml, while the CTPS concentration was varied from 10 mg/ml to 20 mg/ml. $N_2$ gas, saturated with 70% humidity, was used to create the breath figures. The flow rate was 200 ml/min at 1 atm pressure.

Figure 9A:
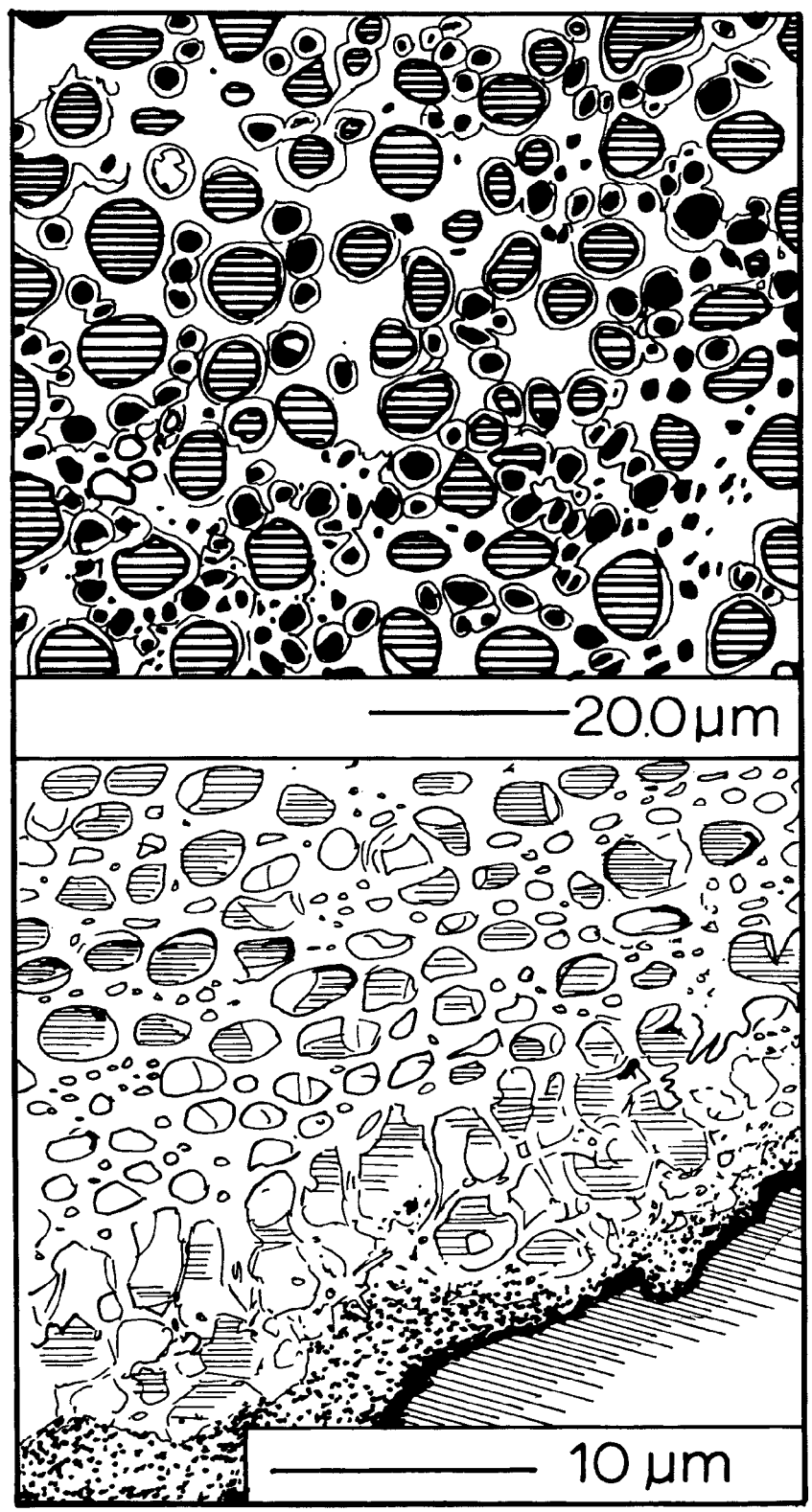
FIG. 9 shows effect of CTPS concentration on the resultant microstructures. The concentration of TTIP was fixed at: 4.0 mg/ml. The concentrations of CTPS for (a): 2.0 mg/ml (b): 10 mg/ml; (c): 15 mg/ml; (d): 20 mg/ml. Flow rate for 70% humidity $N_2$ gas: 200 ml/min.
Figure 9B:
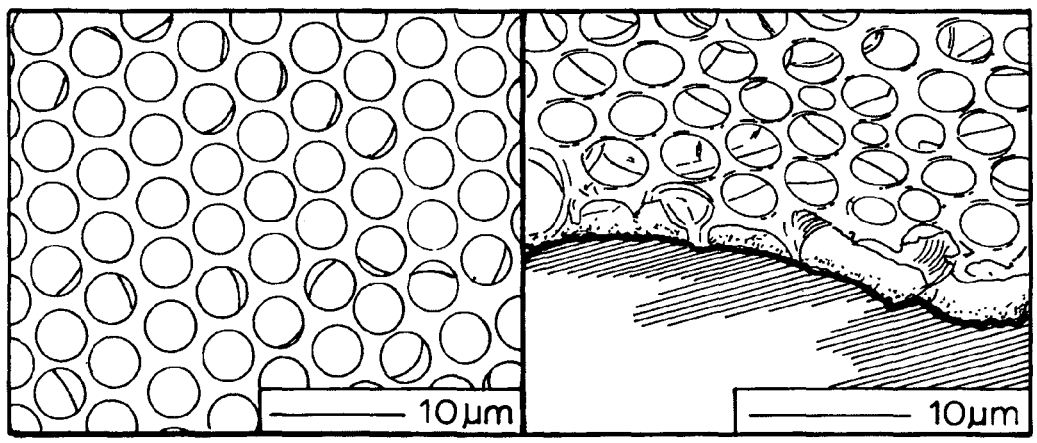
Figure 9C:
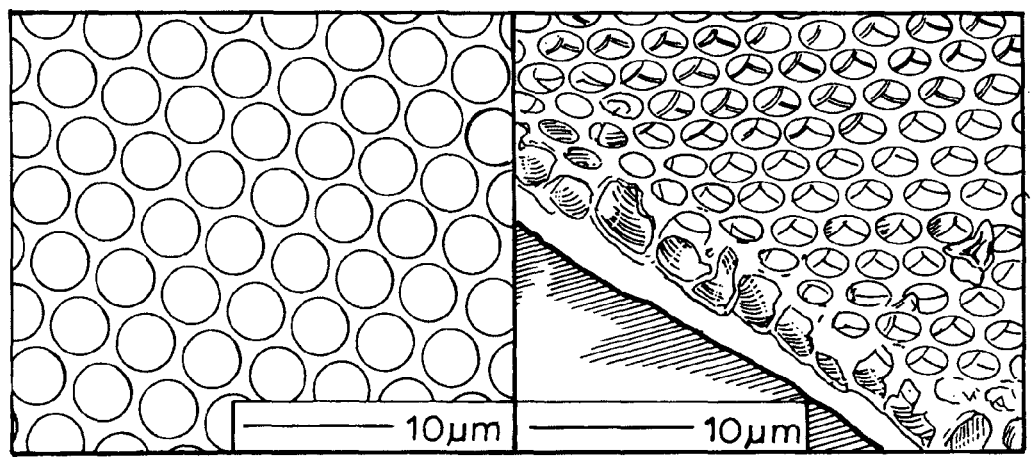
Figure 9D:
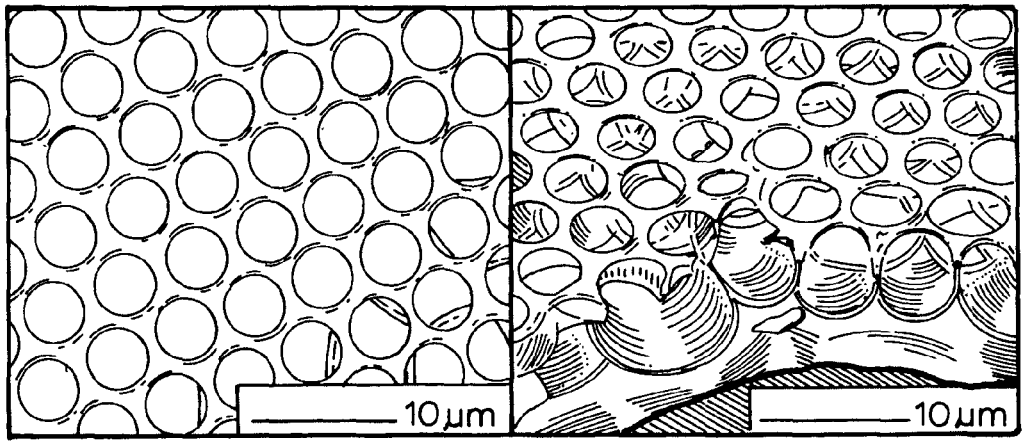

FIG. 9(a) reveals that when a very low CTPS concentration (i.e. 2.0 mg/ml) is used, though breath figures can still be obtained, they are not in a form of highly ordered uniform honeycomb-like pattern microstructure. This occurs because the amount of structure directing agent (CTPS) is insufficient to separately hold the water droplets to produce regular pattern breath figures. However, it can be seen from FIGS. 9(b) to (d) that regular highly ordered breath figure microstructure can be obtained when CTPS concentrations are equal to or greater than 10 mg/ml. The micro-pore diameters obtained for CTPS concentrations of 10 mg/ml, 15 mg/ml and 20 mg/ml were of 3.8 µm, 3.4 µm and 3.9 µm, respectively. This indicates that while a change in CTPS concentration may influence micro-pore diameters, the extent of this influence appears limited.

Resultant film thicknesses were also measured. It was found that the thicknesses of the films for CTPS concentrations of 10 mg/ml, 15 mg/ml and 20 mg/ml were 4.8 µm, 6.0 µm and 8.3 µm, respectively. This suggests that an increase in the CTPS concentration has a greater influence on the film thickness.

Effect of Flow Rate

Figure 10:
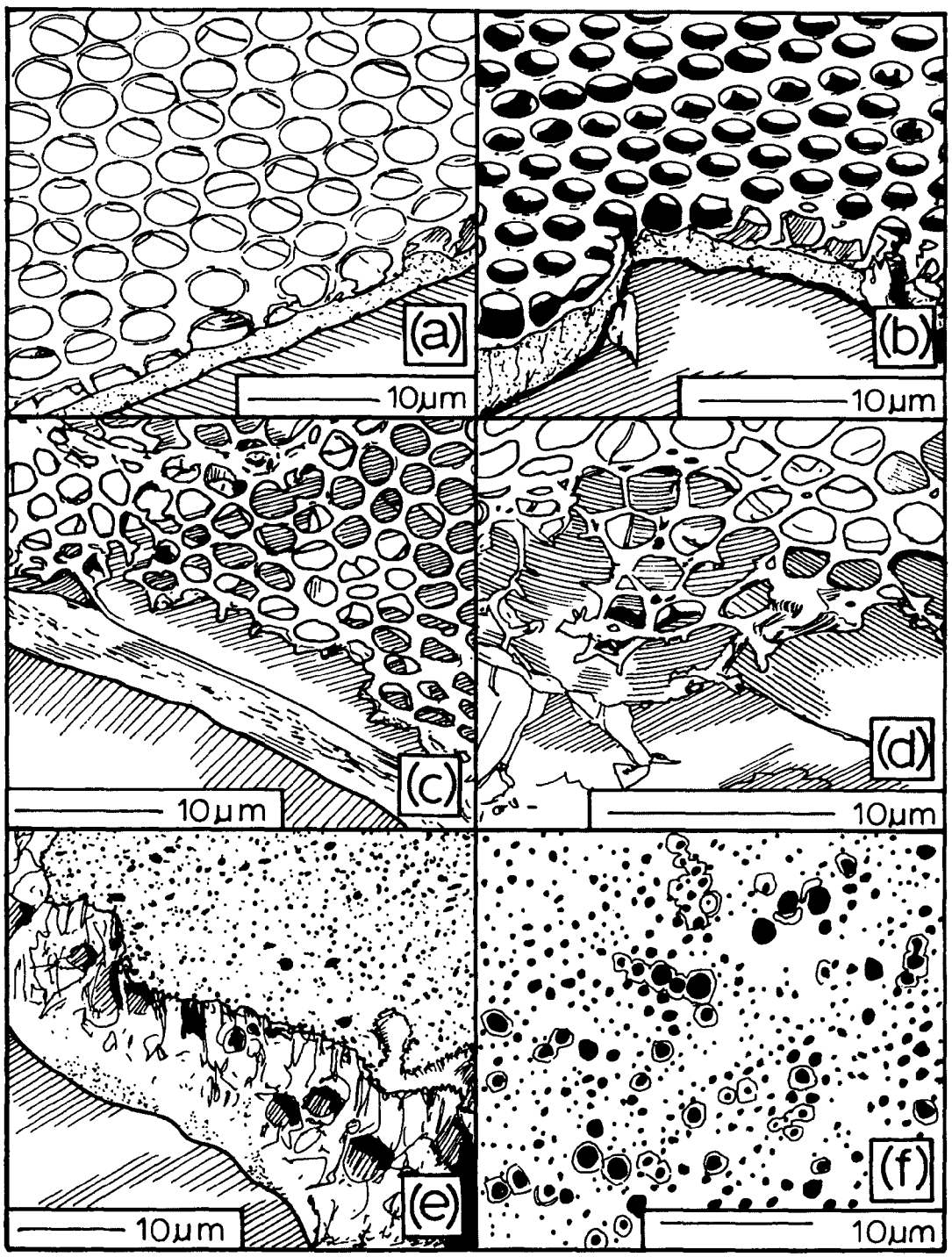
FIG. 10 shows effect of $N_2$ flow rate on the resultant microstructures. The concentration of TTIP is 2.0 mg/ml and the concentration of CTPS is 10.0 mg/ml. Flow rates are (a): 200 ml/min; (b): 400 ml/min; (c): 600 ml/min; (d): 800 ml/min. (e) and (f) are at 4000 ml/min. Humidity of the $N_2$ gas is 80%.

It is well known that flow rate is an important parameter determining whether breath figures can be formed. Thus FIG. 10 shows the effect of flow rate on the resultant microstructures.

The solution composition for the experiment was 2.0 mg/ml of TTIP with 10 mg/ml of CTPS. The humidity of the $N_2$ gas was controlled at 70%.

A normal breath figure microstructure with a micro-pore diameter of 4.0 µm and a thickness of 4.3 µm was obtained when a flow rate of 200 ml/min was used (see FIG. 10(a). FIG. 10(b) employed a flow rate of 400 ml/min. The micro-pore diameter and the film thickness obtained were 4.5 µm and 5.8 µm, respectively. A further increase in the flow rate resulted in a deformation of the microstructures (see FIGS. 10(c) and (d)). Under these conditions, the micro-pore layer had separated from the base (i.e., it was floating on the surface). An extremely high flow rate (i.e. 4000 ml/min) can destroy the breath figure pattern, as shown in FIGS. 10(e) and (f).

Optimal Conditions

Optimal synthesis conditions were obtained by collectively evaluating all factors and considering their effect on the final microstructures in terms of uniformity, degree of defects, micro-pore size and size distribution. These conditions are as follows:

TTIP concentration: 2.0 mg/ml;
CTPS concentration: 10 mg/ml;
Flow rate: 200 ml/min with a $N_2$ gas humidity of 83.2%.

Figure 11:
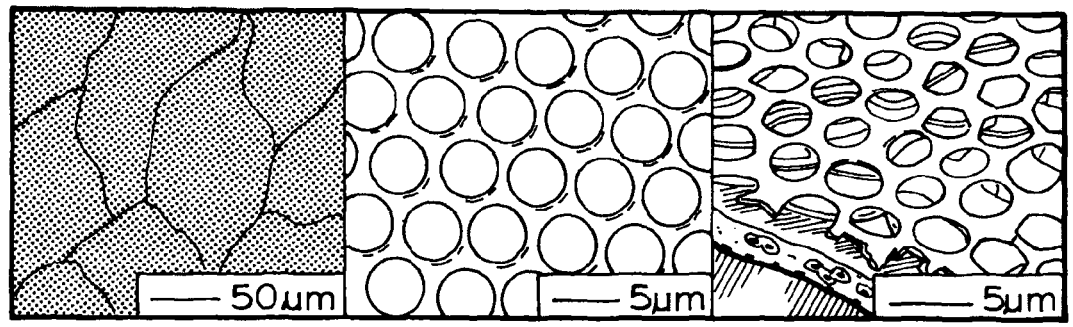
FIG. 11 shows a set of typical SEM images obtained under optimal experimental conditions.

These conditions were used for all subsequent experiments, unless otherwise stated. A set of typical RFSEM images for these optimal conditions are provided in FIG. 11.

Figure 12:
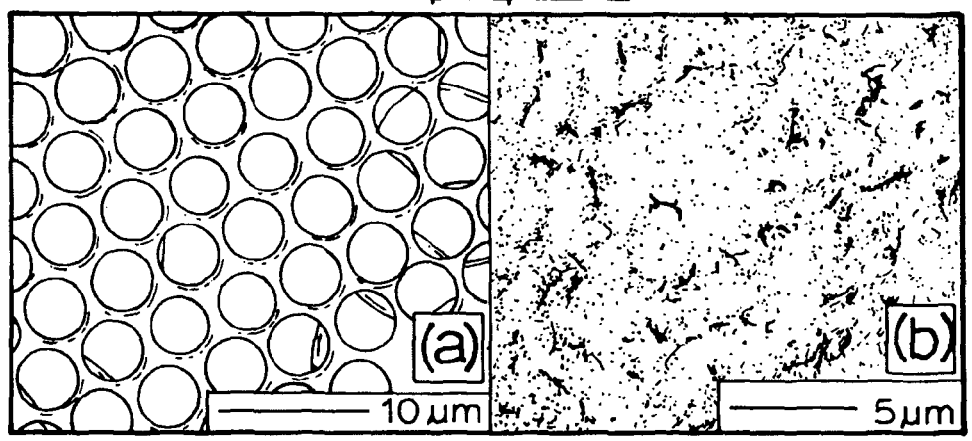
FIG. 12 shows SEM images obtained from an unpretreated precursor template before (a) and after (b) thermal treatment at 550° C. for 2 hours.

The hybrid precursor templates prepared via the breath figures method require further treatment to remove any residual organic components and to convert the titanium component into its photoactive crystal form. An initial attempt was made to achieve this by a direct thermal treatment process. An untreated hybrid precursor template (see FIG. 12(a)) was calcined at 550° C. for 2 hours. The resultant template SEM image is shown in FIG. 12(b)). It was found that the original 3-D micro-hexagonal structures were completely destroyed during the thermal treatment process, producing a highly porous $TiO_2$ film.

Further investigation revealed that the melting of CTPS at an early stage of the thermal treatment was responsible for dismantling the original microstructure. This occurs due to the titanium component in the template being trapped within the CTPS matrix without sufficient mechanical strength. When the temperature reaches the melting point temperature of CTPS, the liquid CTPS leads to destruction of the 3-D microstructure. Evaporation of CTPS also resulted in a highly porous film. It will be obvious that to maintain suitable 3-D microstructures, a pretreatment process must be introduced to counter this problem.

Figure 13:
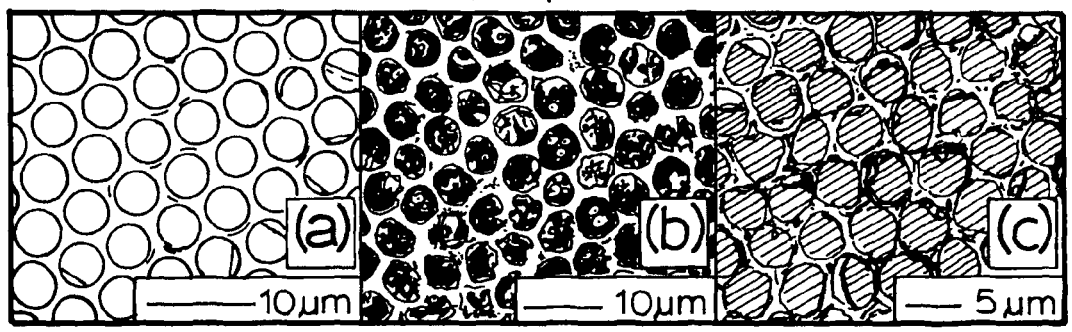
FIG. 13 shows SEM images obtained from a precursor template (a) before UV treatment; (b) after UV treatment for 24 hours and (c) after thermal treatment at 550° C. for 2 hours.

Therefore a UV treatment method was investigated to overcome the CTPS melting problem during the thermal treatment process. It is well known that UV-C can effectively break down organics. CTPS is an organic polymer and if UV can break it down into small molecules that could evaporate at low temperature, then it becomes possible to remove the CTPS before the thermal treatment and the 3-D microstructure may be retained as the result. The precursor template (see FIG. 13(a)) was subjected to UV treatment for 24 hours. The SEM image of the resultant template is shown in FIG. 13(b) where it can be seen that the CTPS has been broken down and that a large portion of the CTPS may have been removed through this UV treatment process. Though the original pattern was maintained, it had been reduced to an almost 2-D structure, due to the collapse of the titanium component (see FIG. 13(b)).

FIG. 13(c) shows the SEM image of the UV treated sample after thermal treatment. It reveals that the structure had been further reduced to a flat 2-D structure, though the original pattern was still clearly retained.

Hydrothermal Treatment

Figure 14:
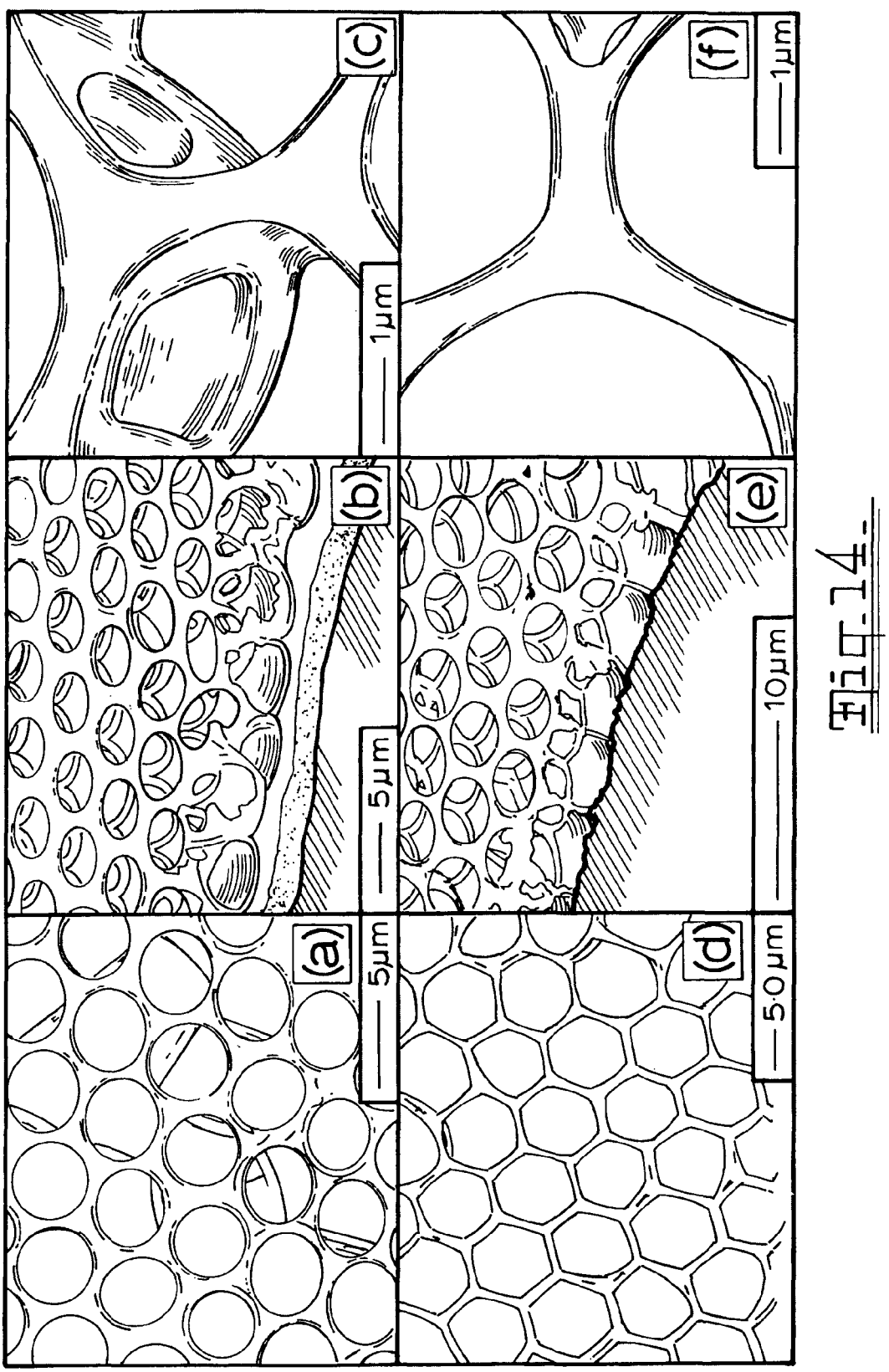
FIG. 14 shows SEM images obtained from a precursor template. Images (a), (b) and (c) are the top-view, cross-section view and enlarged cross-section view respectively of the resultant template after hydrothermal treatment at 100° C. for 72 hours under 100% humidity and images (d), (e) and (f) are the top-view, cross-section view and enlarged cross-section view respectively of the UV treated template after thermal treatment at 550° C. for 2 hours.

The result obtained from UV treatment suggests that the removal of CTPS before the thermal treatment is not sufficient to achieve the objective of retaining the 3-D microstructure. This is mainly due to the weak mechanical strength of the remaining titanium inorganic component. Therefore, a hydrothermal treatment method was proposed to covert the titanium inorganic component into a $TiO_2$ network structure (i.e., a sort of inorganic polymer) before the thermal treatment. Achievement of this step with a resultant $TiO_2$ network structure that possesses sufficient mechanical strength, should overcome issues related to the melting of CTPS during the thermal treatment process and will not lead to any dismantling of the 3D microstructures. Therefore, hydrothermal treatment was carried out in an oven at 100° C. for 72 hrs at 100% humidity. The top-view, cross-section view and enlarged cross-section view SEM images of the precursor template (with the 3-D microstructure the same as shown in FIG. 13(a)) after hydrothermal treatment are provided in FIGS. 14(a) to (c). These images reveal no significant change in 3-D microstructure compared with the original template. This hydrothermally treated template was then subjected to a thermal treatment process at 550° C. for 2 hours. FIGS. 14(d) to (f) show the top-view, cross-section view and enlarged cross-section view SEM images of the hydrothermally treated template after this thermal treatment step. The effectiveness of the hydrothermal treatment is clearly demonstrated by these images, as the original 3-D microstructure has been well preserved after the high temperature thermal treatment.

It was also found that secondary nanoporous structures were created after the thermal treatment, due to removal of the CTPS organic components. This is in strong contrast to the UV treated template, which revealed a nonporous surface. The wall thickness between micropores was reduced after the thermal treatment, due to the loss of organic component. These experimental conditions were subsequently used for the fabrication of all breath figure produced photoanodes.

Figure 15:
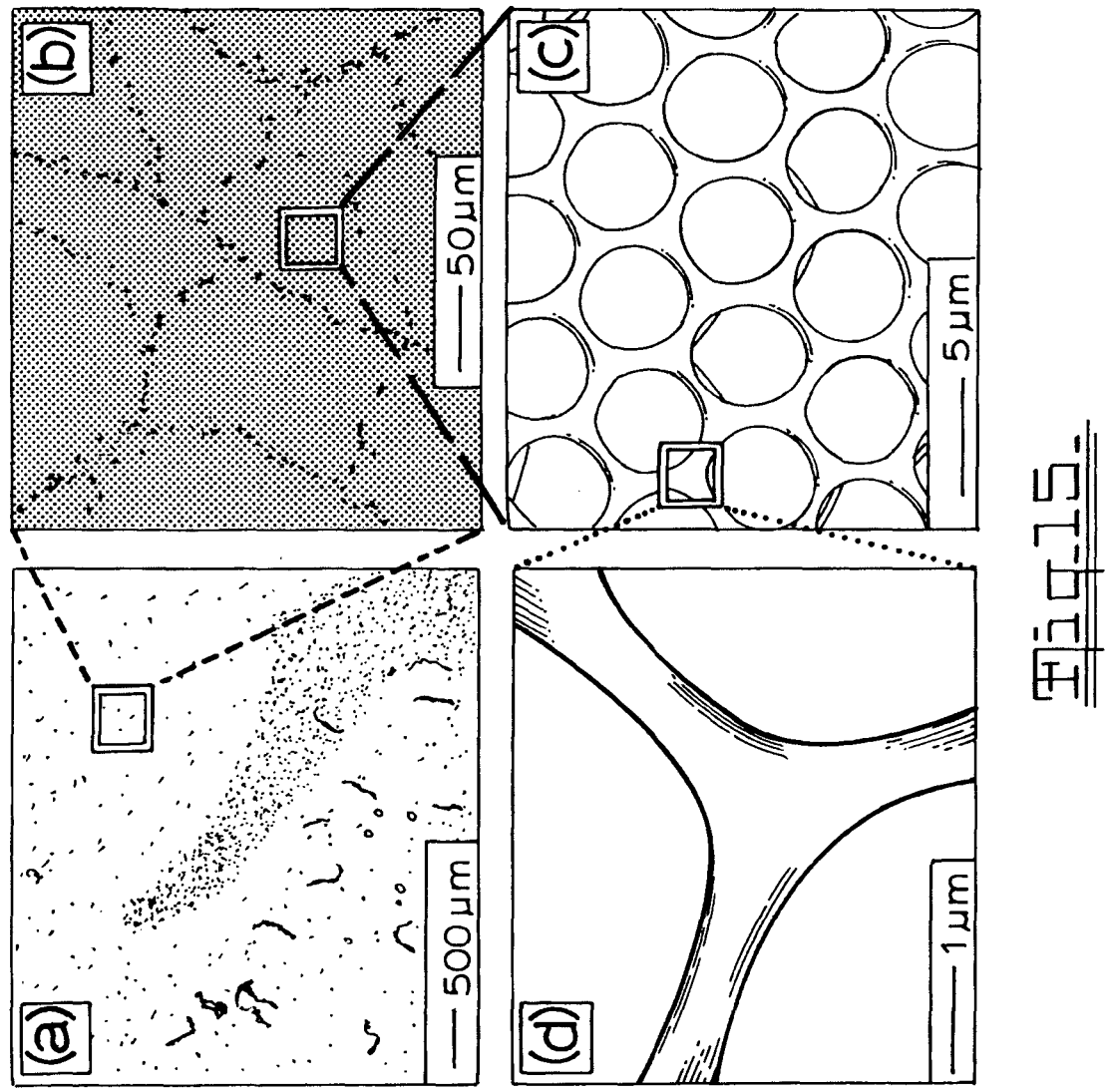
FIG. 15 shows SEM images of the photoanode at different magnifications.

SEM images of the resultant photoanode are shown at different magnifications in FIG. 15. The nanoporous structure is readily seen from the enlarged SEM image (see FIG. 15(d)). This was further investigated.

Figure 16:
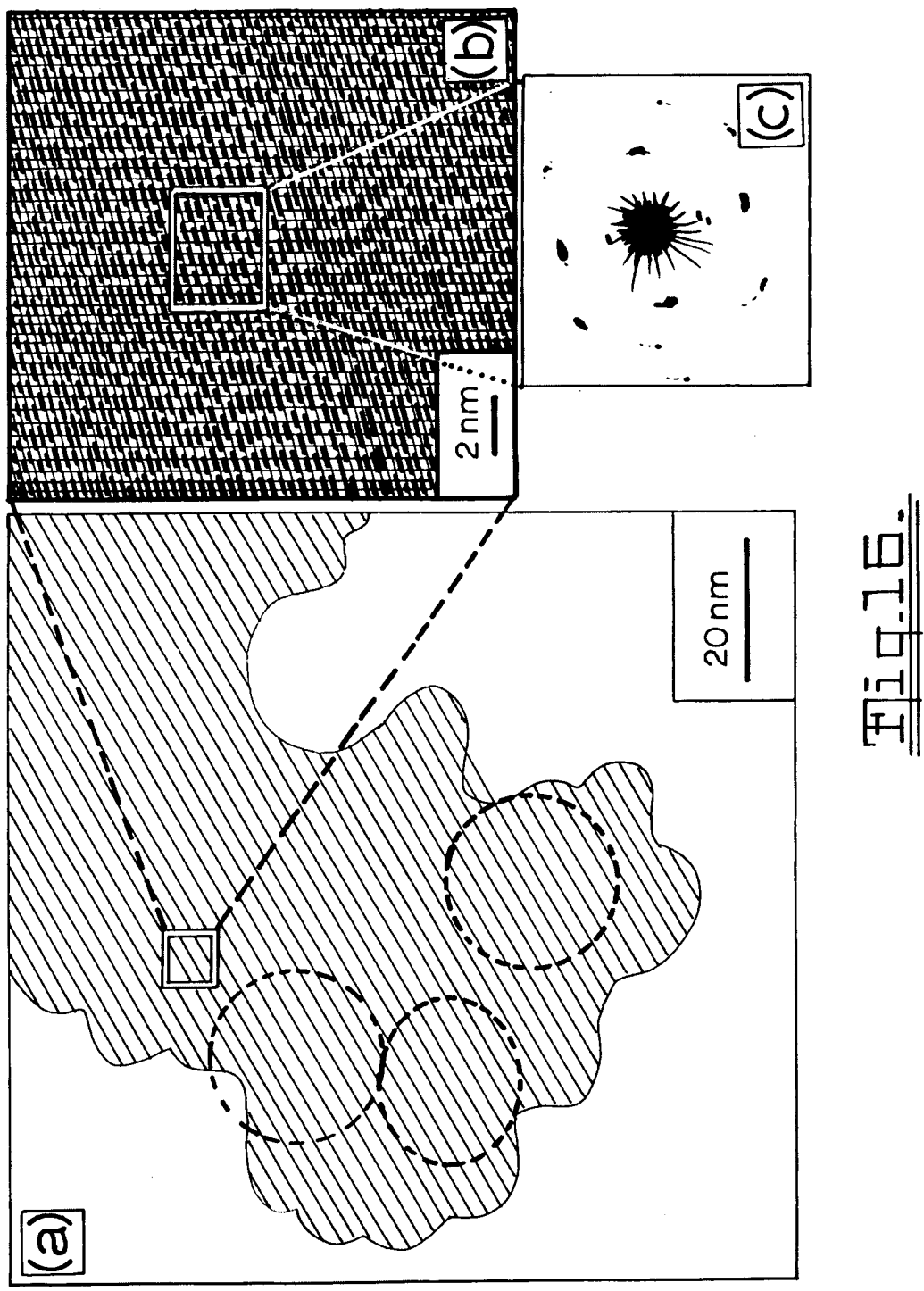
FIG. 16 shows HRTEM images of the resultant photoanode (a) and (b), and the electron diffraction patterns the resultant photoanode (c)

FIG. 16 shows HRTEM images and electron diffraction patterns of the resultant photoanode. The HRTEM image in the figure reveals a very clearly defined (101) plane with perfect crystalline line (i.e., the distance between the atom layers in the 101 plane within each crystal grain particle), indicating high crystallinity. The high crystallinity is also supported by the diffraction patterns obtained at the same location. The images also reveal that the primary particle sizes are from 15 nm to 20 nm.

X-ray diffraction patterns were obtained to confirm the effectiveness of the thermal conversion process and the crystal phase of the resultant photoanode structure. It was found that no crystalline form $TiO_2$ is obtained from the precursor template and the template after UV treatment. However, the anatase phase of $TiO_2$ begins to appear after the template is hydrothermally treated for 72 hours, indicating the formation of the $TiO_2$ network that is responsible for holding the 3-D microstructure unchanged during thermal treatment. However, crystallisation was far from complete.

XRD patterns obtained from thermally treated template revealed that the $TiO_2$ was completely converted to pure anatase at 550° C. No $TiO_2$ rutile phase patterns were noted.

The nanoporous characteristics, such as specific surface area, the mean pore equivalent diameter and the average pore volume, were investigated using Brunauer-Emmett-Teller (BET) and Barrett-Joyner-Halenda (BJH) methods. The $N_2$ adsorption-desorption isotherms of the sample yielded isotherms exhibiting type IV characteristics. According to the IUPAC classification, the hysteretic loops correspond to the type H2, which presents a case of disordered and poorly defined pore size and shape distribution. The sample displayed high specific surface area and pore volume of 127 $m^2/g$ and 0.77 $cm^3/g$, respectively. The pore size distribution was within the range of 8 nm to 38 nm with the maximum distribution around 19 nm.

Effect of Light Intensity on Photocurrent Response

The effect of light intensity on photocurrent response in the absence of organics (i.e., only water oxidation occurring) was investigated. Voltammograms were obtained at the photoanode in 0.1 M $NaNO_3$ under different illumination intensities. At each light intensity the photocurrent response increased linearly with applied potential before levelling off. Both the saturation photocurrent and the potential range of the linear part of the I-E curve increased as the light intensity increased. The linear I-E relationship so obtained indicates that the electrode is behaving similarly to a nanoparticulate photoanode. The pure resistor type behaviour indicates that the rate of the reaction within the linear range is controlled by the electron transport in the $TiO_2$ film. The photocurrent (i.e., the rate of reaction) observed in this part of the curve reflects how fast electrons in the semiconductor film can be removed by the applied potential. At a given light intensity, an increase in the applied potential leads to an increase in the electromotive force, which, in turn, leads to a proportional increase in the photocurrent (as expected from Ohm's law).

The relationship between the saturated photocurrents (measured at +0.40 V) and the light intensity was investigated. In this region of the I-E curves, the rate-determining step is the interfacial reaction rather than the electron transport process in the film. Plotting the saturation photocurrent against light intensity gives a straight line. This linear dependence is indicative of the general assumption of the photocatalytic process that the interfacial reaction with respect to surface-bound photoholes is a first order reaction. Again, this result is similar to the relationship obtained from a nanoparticle photoanode.

The effect of light intensity on photocurrent responses in the presence of organics was investigated. Voltammograms were obtained at the photoanode in a solution containing 45 mM glucose and 0.1 M $NaNO_3$ under different illumination intensities. The characteristics of the voltammograms were found to be qualitatively similar to those obtained in absence of organics. Plotting the saturation photocurrent against the light intensity also gives a straight line, which is the same as that which was observed in the case of an absence of organics.

The photocurrent and concentration relationship was investigated. Voltammograms were obtained at the $TiO_2$ photoanode, with or without the UV illumination, in a 0.1 mM $NaNO_3$ blank solution and various concentrations of glucose containing 0.1 mM $NaNO_3$. As expected, it was found that without UV illumination, no measurable current was observed for both either the blank or glucose solutions. In all other cases, the glucose I-E responses increased linearly with potential before levelling to saturated photocurrent values.

The net saturated photocurrent ($\Delta I_{sph}$) was plotted against the glucose concentration. It was found that $\Delta I_{sph}$ values increased linearly with concentration up to 5.0 mM. Below this concentration, the rate of the photoelectrocatalytic process is limited by the mass transfer of glucose to the electrode surface (i.e., it is a diffusion controlled process). At higher concentrations the $\Delta I_{sph}$ values level off, at which point the reaction rate becomes limited by film/solution interfacial reactions, and, in particular, by the photohole capture process, which dominates the overall reaction at these concentrations.

Note that the results are qualitatively similar to those shown in previously for the nanoparticulate photoanodes.

The photoelectron collection efficiency of the photoanode was examined. The evaluation was carried out by comparing the theoretical net charge with the measured net charge from different concentrations of glucose. The slopes obtained for the theoretical and measured net charge plots were 19.84 and 6.92 respectively. If 100% electron collection efficiency had been achieved, the slope of the measured net charge plot should have been the same as the theoretically predicted slope. The smaller slope obtained from the measured net charge plot indicates that only a fraction of total photoelectrons were collected. The ratio between the two slopes is 0.35, which indicates 35% of photoelectrons originating from the oxidation of glucose have been collected. A detailed investigation has revealed that the low electron collection efficiency is due to the poor connectivity between the nanoparticles. This is primarily because the photoanode, as prepared by breath figures method, is highly porous.

Conclusions

An organic/metal oxide hybrid template with highly ordered and perfectly patterned 3-D micro-hexagonal structures can be prepared by the breath figure method. Such a hybrid template can be directly converted into a photoactive pure $TiO_2$ while retaining an unchanged 3-D micro-hexagonal structure. A key aspect of this invention is the discovery of a gaseous phase hydrothermal treatment method (ageing), which enables effective conversion of an organo-titanium hybrid into an inorganic titania network that has sufficient mechanical strength to maintain its original 3-D micro-hexagonal structure during subsequent further thermal treatment.

The resultant photoanode possesses a highly ordered and perfectly patterned 3-D micro-hexagonal structure that is built with highly porous nanoparticles. This gives rise to its nanomaterial properties. The unique structural configuration and extremely high active surface area of the photoanode allows for further modification and improvement across a wide range of applications.

The photoelectrochemical behaviour of the resultant photoanodes was found to be similar to those of photoanodes made of nanoparticulate $TiO_2$. However, this novel microstructure $TiO_2$ photoanode possesses low connectivity between the grain nanoparticles, leading to lowered photoelectron collection efficiency.

From the above examples it can be seen that the present invention provides two different fabrication methods for forming $TiO_2$ photocatalysts with a variety of morphological structures.

Those skilled in the art will realise that this invention may be implemented in embodiments apart from those described herein without departing from the core teachings of the invention.

The invention claimed is:

1. A method of forming a titanium dioxide thin film photocatalyst in which,
    a) titanium dioxide colloidal particles are formed in solution and then subjected to dialysis while maintaining the pH below 4,
    b) the dialysed solution is then subjected to a hydrothermal treatment,
    c) the colloid from step b) is then coated on a substrate of conducting glass and dried, and
    d) the coated substrate from step c) is calcined from 700 C to 800 C to produce a titanium dioxide layer which contains from 0.1% to 3.5% rutile and the balance anatase.

2. A method of forming a titanium dioxide photocatalyst as claimed in claim 1 in which the colloid from step b) has an average particle size in the range of 8 to 35 nm.

3. A method as claimed in claim 1 in which the dialysis is concluded at a pH of about 3.8 and the calcination is at about 700 C for about two hours.

4. A method of forming a titanium dioxide photocatalyst as claimed in claim 1 which the substrate is conducting glass which is sequentially washed with detergent, chromic acid and alcohol.

5. A method as claimed in claim 4 in which the titanium dioxide layer has a thickness of from 0.5 to 20 microns.

6. A method as claimed in claim 1, in which step c) is repeated before proceeding to step d).

7. A method as claimed in claim 1, in which the colloidal particles are filtered prior to the dialysis treatment.

* * * * *